(12) United States Patent
Takamatsu et al.

(10) Patent No.: US 10,766,363 B2
(45) Date of Patent: Sep. 8, 2020

(54) SURFACE PANEL, DISPLAY UNIT, ON-VEHICLE DISPLAY DEVICE, AND INSTRUMENT PANEL

(71) Applicant: Yazaki Corporation, Tokyo (JP)

(72) Inventors: Masahiro Takamatsu, Makinohara (JP); Tai Inoue, Makinohara (JP); Masahide Nagata, Makinohara (JP); Takayuki Ogawa, Makinohara (JP); Gosei Sato, Makinohara (JP); Takao Kanai, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 107 days.

(21) Appl. No.: 15/434,677

(22) Filed: Feb. 16, 2017

(65) Prior Publication Data

US 2017/0158056 A1 Jun. 8, 2017

Related U.S. Application Data

(63) Continuation of application No. PCT/JP2015/075867, filed on Sep. 11, 2015.

(30) Foreign Application Priority Data

Sep. 12, 2014 (JP) .................. 2014-186905
Sep. 12, 2014 (JP) .................. 2014-186928
Sep. 12, 2014 (JP) .................. 2014-186939

(51) Int. Cl.
*B60K 35/00* (2006.01)
*G02B 27/01* (2006.01)
(Continued)

(52) U.S. Cl.
CPC ............. *B60K 35/00* (2013.01); *B60K 37/02* (2013.01); *G02B 27/0018* (2013.01);
(Continued)

(58) Field of Classification Search
CPC G02B 27/01; G02B 27/0101; G02B 27/0118; G02B 27/0149
See application file for complete search history.

(56) References Cited

U.S. PATENT DOCUMENTS 3,679,887 A 7/1972 Kennedy
4,567,082 A 1/1986 Tabata et al.
(Continued)

FOREIGN PATENT DOCUMENTS

CN 101489819 A 7/2009
CN 103460114 A 12/2013
(Continued)

OTHER PUBLICATIONS

Communication dated Jul. 18, 2017, from the Japanese Patent Office in counterpart application No. 2014-186905.
(Continued)

*Primary Examiner* — Robert E. Tallman
(74) *Attorney, Agent, or Firm* — Sughrue Mion, PLLC

(57) ABSTRACT

A surface panel is attached to an instrument panel so as to cover a display surface of a display unit disposed on the instrument panel of a vehicle. When the display unit is turned on, light L from the display unit is projected toward the driver's seat side via a thin hole formed in the surface panel.

22 Claims, 27 Drawing Sheets

(51) Int. Cl.
  *B60K 37/02* (2006.01)
  *G02B 27/00* (2006.01)
(52) U.S. Cl.
  CPC .... *G02B 27/0101* (2013.01); *B60K 2370/155* (2019.05); *B60K 2370/1523* (2019.05); *B60K 2370/164* (2019.05); *B60K 2370/166* (2019.05); *B60K 2370/332* (2019.05); *B60K 2370/334* (2019.05); *B60K 2370/339* (2019.05); *B60K 2370/39* (2019.05); *B60K 2370/693* (2019.05); *B60Y 2400/92* (2013.01)

(56) References Cited

U.S. PATENT DOCUMENTS

| | | | | |
|---|---|---|---|---|
| 4,709,988 | A | * | 12/1987 | Kai ................ G02B 5/00 359/613 |
| 4,804,254 | A | | 2/1989 | Doll et al. |
| 5,673,995 | A | | 10/1997 | Segaud |
| 6,181,301 | B1 | | 1/2001 | Inoguchi et al. |
| 8,371,137 | B2 | * | 2/2013 | De Ryckel ........ G09F 27/008 359/601 |
| 2002/0054440 | A1 | * | 5/2002 | Akamine ............ B60K 35/00 359/893 |
| 2002/0097163 | A1 | | 7/2002 | Pederson |
| 2005/0212994 | A1 | | 9/2005 | Usami |
| 2006/0202617 | A1 | | 9/2006 | Yamada |
| 2009/0303738 | A1 | | 12/2009 | Süss et al. |
| 2012/0153656 | A1 | * | 6/2012 | Casey ................ B60K 37/00 296/1.08 |
| 2013/0258693 | A1 | * | 10/2013 | Hatakeyama ........ B60K 35/00 362/509 |
| 2014/0022645 | A1 | | 1/2014 | Matsuura et al. |

FOREIGN PATENT DOCUMENTS

| | | | |
|---|---|---|---|
| FR | 2842471 | A1 | 1/2004 |
| JP | 58-065518 | U | 5/1983 |
| JP | 60-29349 | A | 2/1985 |
| JP | 60-168103 | A | 8/1985 |
| JP | 63-502377 | A | 9/1988 |
| JP | 01-062131 | U | 4/1989 |
| JP | 2-189803 | A | 7/1990 |
| JP | 06-171396 | A | 6/1994 |
| JP | 06-067156 | U | 9/1994 |
| JP | 9-267661 | A | 10/1997 |
| JP | 10-091076 | A | 4/1998 |
| JP | 2000-315405 | A | 11/2000 |
| JP | 2001-331132 | A | 11/2001 |
| JP | 2003-057080 | A | 2/2003 |
| JP | 2003-114635 | A | 4/2003 |
| JP | 2003-122266 | A | 4/2003 |
| JP | 2005-31476 | A | 2/2005 |
| JP | 2005-119344 | A | 5/2005 |
| JP | 2005-186784 | A | 7/2005 |
| JP | 2005-275262 | A | 10/2005 |
| JP | 2005-349977 | A | 12/2005 |
| JP | 2006-252989 | A | 9/2006 |
| JP | 2008-128997 | A | 6/2008 |
| JP | 2008-290685 | A | 12/2008 |
| JP | 2009-208680 | A | 9/2009 |
| JP | 2009-248846 | A | 10/2009 |
| JP | 2012-011822 | A | 1/2012 |
| JP | 2012-117846 | A | 6/2012 |
| JP | 2012-126251 | A | 7/2012 |
| JP | 2013-078969 | A | 5/2013 |
| TW | 20090223476 | U | * 5/2010 |

OTHER PUBLICATIONS

Communication dated Aug. 1, 2018, issued by the State Intellectual Property Office of the People's Republic of China in counterpart Chinese Patent Application No. 201580044436.3.
Communication dated Dec. 6, 2016, issued by the Japanese Patent Office in counterpart Japanese application No. 2014-186905.
Communication dated May 31, 2016, issued by the Japanese Patent Office in counterpart Japanese application No. 2014-186905.
Communication dated May 31, 2016, issued by the Japanese Patent Office in counterpart Japanese application No. 2014-186928.
Written Opinion (PCT/ISA/237) dated Nov. 17, 2015 issued by the International Searching Authority in counterpart International Application No. PCT/JP2015/075867.
International Search Report (PCT/ISA/210) dated Nov. 17, 2015 issued by the International Searching Authority in counterpart International Application No. PCT/JP2015/075867.
Communication dated Sep. 6, 2016, issued by the Japanese Patent Office in counterpart Japanese application No. 2014-186939.
Communication dated Jun. 21, 2016, issued by the Japanese Patent Office in counterpart Japanese application No. 2014-186939.
Communication dated Mar. 25, 2019, issued by the Chinese Patent Office in counterpart Chinese Application No. 201580044436.3.

* cited by examiner

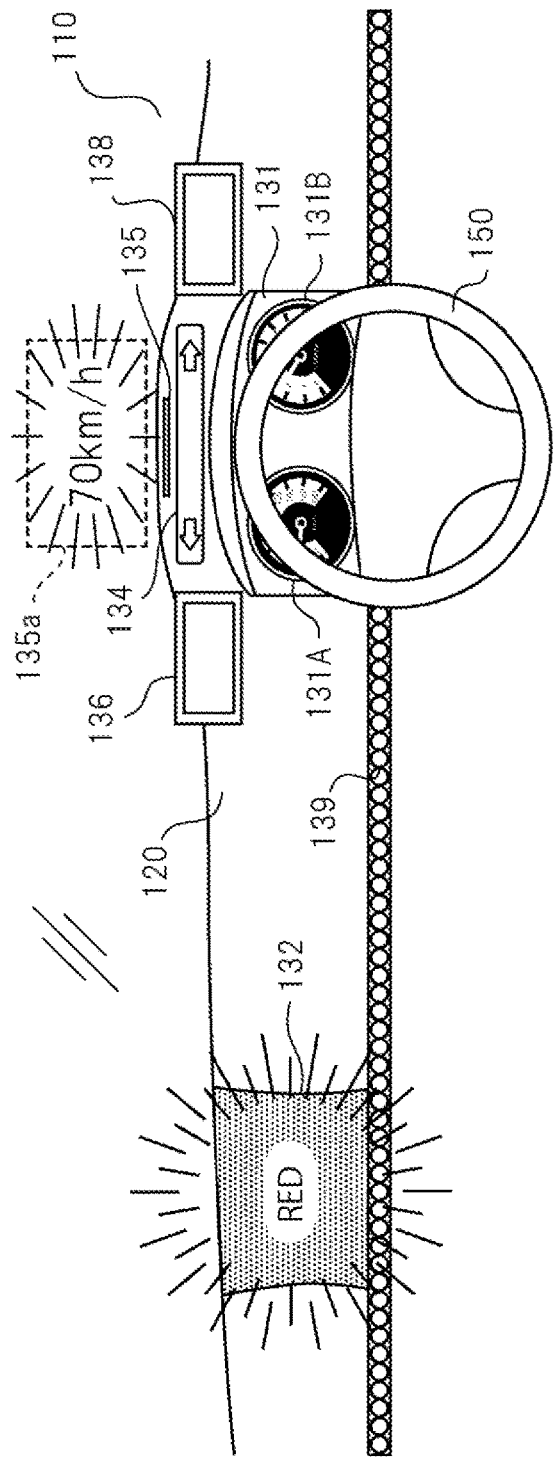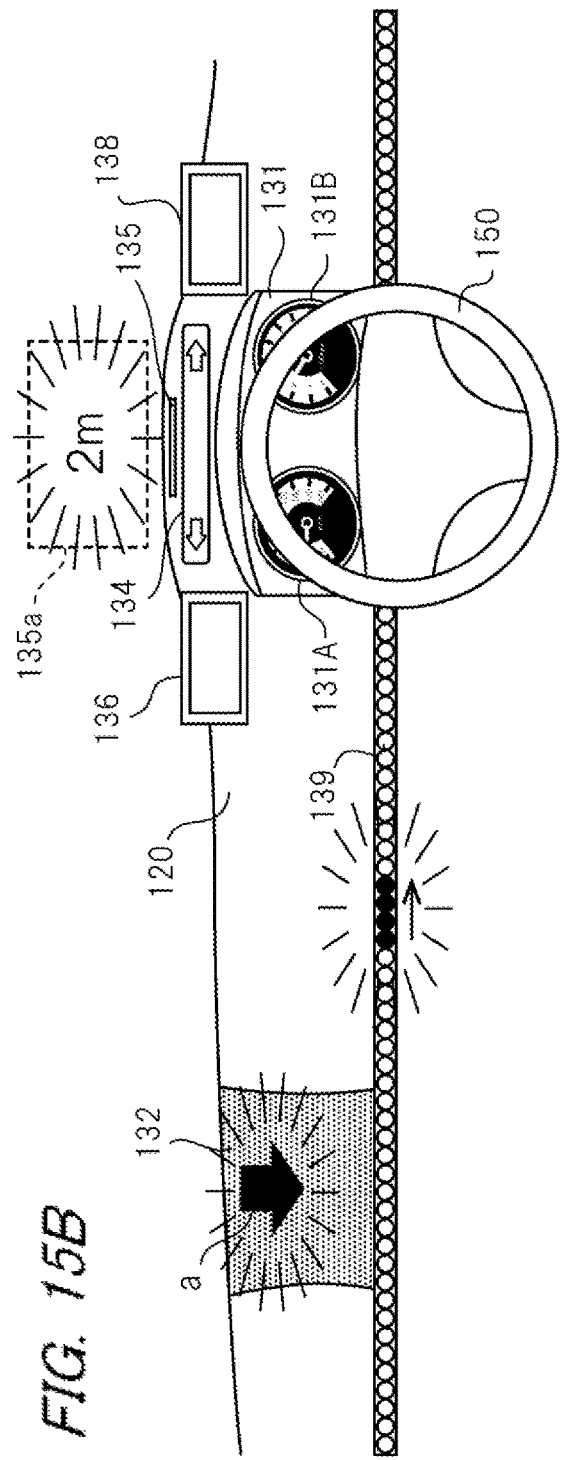

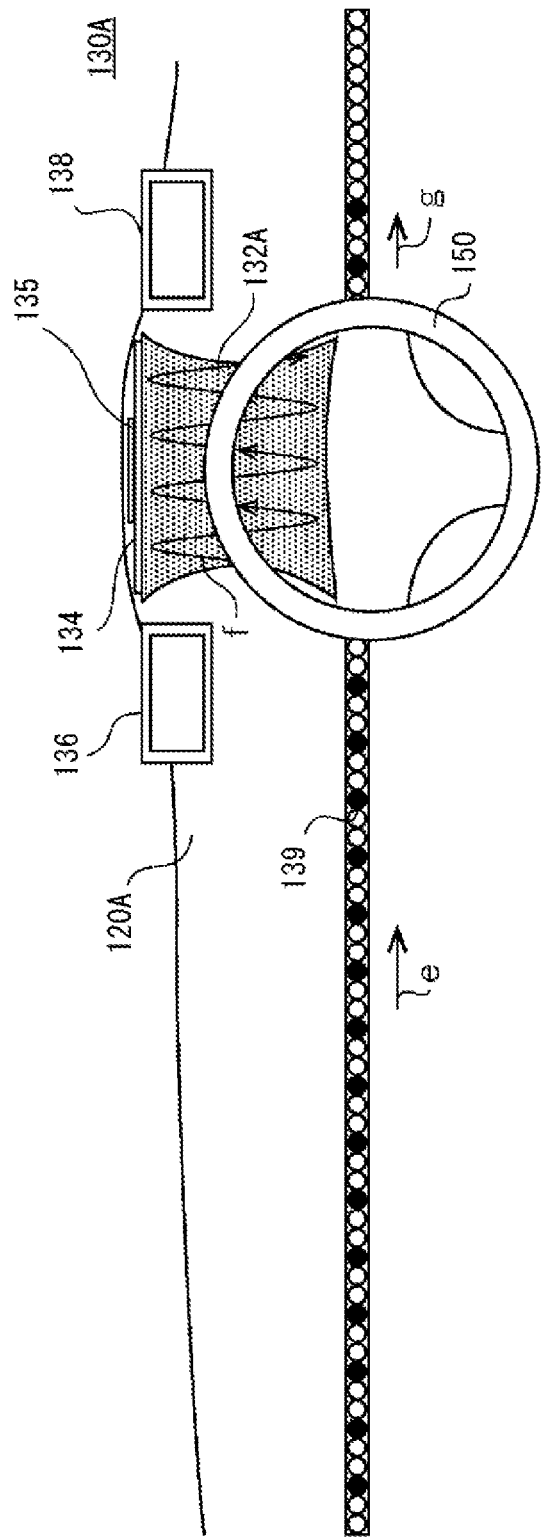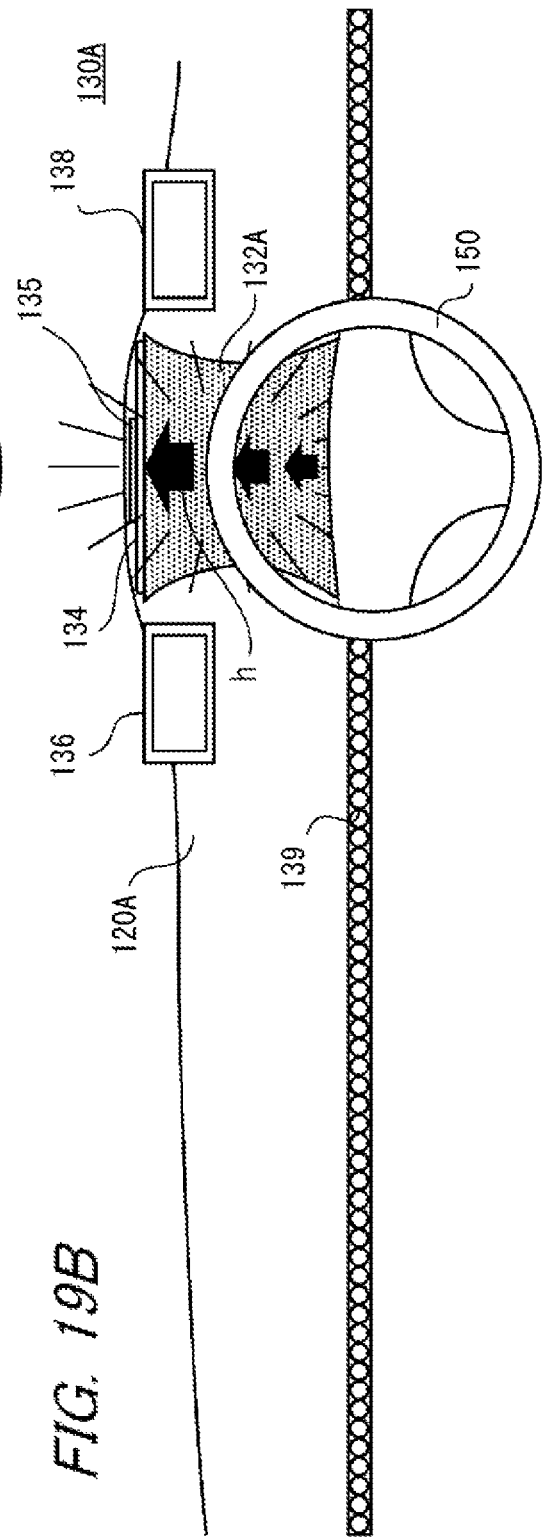

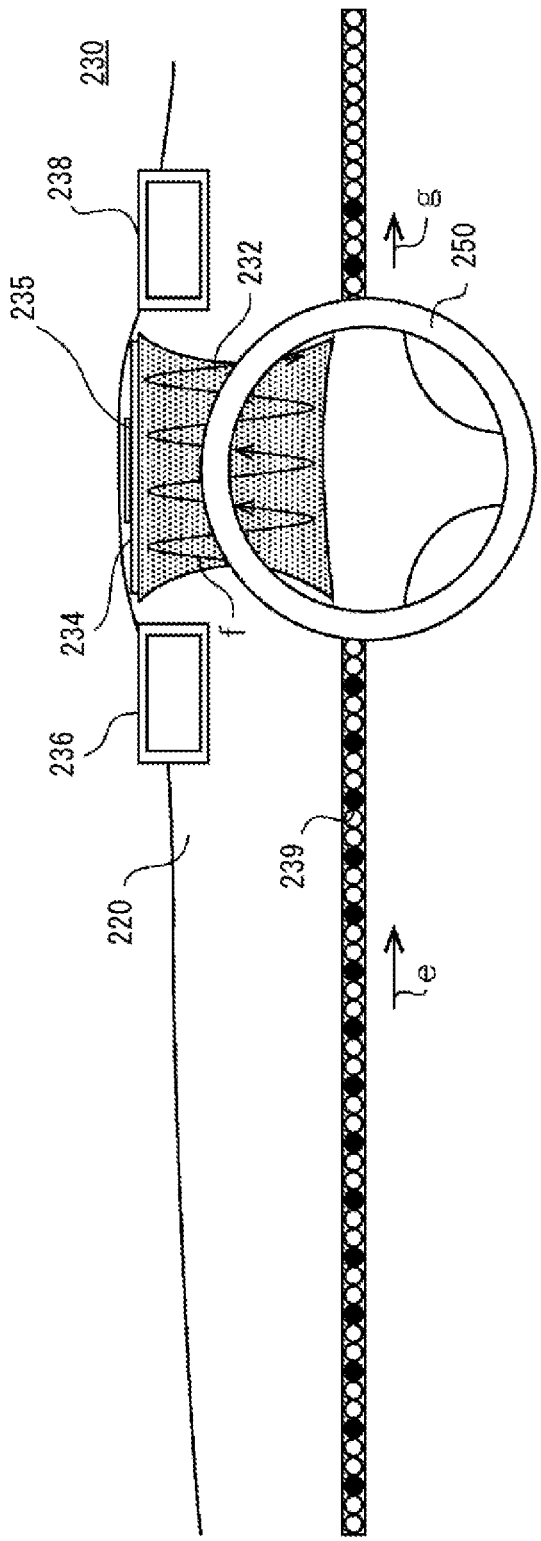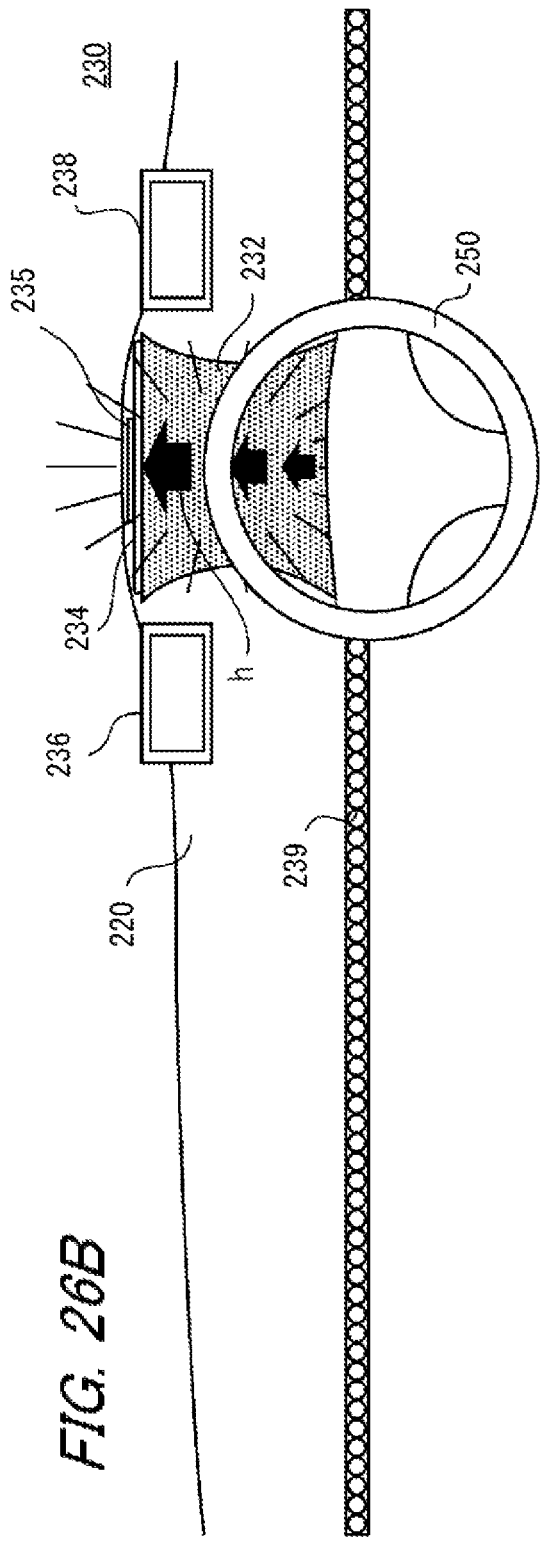

SURFACE PANEL, DISPLAY UNIT, ON-VEHICLE DISPLAY DEVICE, AND INSTRUMENT PANEL

CROSS REFERENCE TO RELATED APPLICATIONS

The present application is a continuation of PCT application No. PCT/JP2015/075867, which was filed on Sep. 11, 2015 based on Japanese Patent Application No. 2014-186939, No. 2014-186928, and No. 2014-186905 all filed on Sep. 12, 2014, the disclosures of which are incorporated herein by reference.

BACKGROUND OF THE INVENTION

1. Technical Field

The present invention relates to a surface panel that is installed so as to cover a display, a display unit, an on-vehicle display device, and an instrument panel.

2. Background Art

Vehicle instrument panels are equipped with a display for displaying a speedometer, an engine tachometer, a fuel meter, etc. at a position suitable for the line of sight of a driver.

If an image displayed on the display installed in the instrument panel is projected onto a windshield, an image corresponding to the image of the display appears in a field of view of the driver who is looking at a scene ahead of the vehicle through the windshield and may obstruct his or her driving.

In view of the above, conventionally, a windshield-side peripheral portion of the display is provided with a meter hood so that an image of the display is not projected onto the windshield (refer to Patent document JP-A-2009-248846). The meter hood serves as a visor of the display and interrupts light going from the display to the windshield, as a result of which an image of the display is not projected in a field of view of the driver and hence a clear field of view is secured.

It has been studied to lower the degree of projection of an image of the display onto a windshield by disposing a light guide film in front of the display and having light emitted from the display pass through the light guide film.

SUMMARY

However, since the meter hood covers the display like a visor, it is a limitation on the design performance of the display. This makes it difficult to create a display that is novel in design. Furthermore, being a member that projects from the peripheral portion of the display as part of the instrument panel, the meter hood increases the cost of the instrument panel.

Where the light guide film is disposed in front of the display, it is difficult to lower the degree of image projection onto the windshield to such a level that it does not affect driving and such an attempt causes increase in the number of components and cost.

The present invention has been made in view of the above circumstances, and an object of the invention is therefore to provide a surface panel, a display unit, an on-vehicle display device, and an instrument panel capable of lowering the degree of image projection onto a windshield to such a level that it does not affect driving without impairing design performance.

To attain the above object, the surface panel, the display unit, the on-vehicle display device, and the instrument panel are characterized by the following items (1) to (21);

(1) A surface panel which is installed so as to cover a display surface of a display portion or portions provided in an instrument panel of a vehicle, wherein:

plural small apertures are formed through the surface panel; and axial lines of the small apertures are inclined so as to be directed to the driver or passenger seat side.

According to the surface panel having the configuration of item (1), the degree of image projection onto the windshield can be lowered to such a level that it does not affect driving without impairing design performance of the instrument panel. A phenomenon can be suppressed that external light shines on the display surface of the display portion or portions directly to render it less viewable. When the display portion or portions are not lit, the inside of the surface panel is dark as a whole and hence the display portion or portions existing inside are not seen, which is novel in design. Furthermore, since the presence of the light source(s) in the instrument panel is not expected, a surprise or unexpectedness may be caused.

(2) The surface panel according to the above item (1), wherein inclination angles of the small apertures are set at such values that an image of the display unit is not projected onto a full area or a prescribed region, included in a field of view of the driver or passenger, of a windshield.

According to the surface panel having the configuration of item (2), the driver or passenger is given a good field of view because an image of the display portion or portions is not projected onto the windshield.

(3) The surface panel according to the above item (2), wherein an extension of a line connecting any pair of points on edges of end openings of each of the small apertures does not intersect the full area or the prescribed region of the windshield.

According to the surface panel having the configuration of item (3), since the small apertures are formed in such a manner that light beams passing through them do not shine on the full area or the prescribed region of the windshield, projection of an image of the display portion or portions can be prevented.

(4) The surface panel according to the above item (2), wherein the inclination angles of the small apertures with respect to the thickness direction of the surface panel are small on the driver or passenger seat side and large on the windshield side.

According to the surface panel having the configuration of item (4), since the inclination angles of the small apertures are varied, light passing through any small aperture does not reach the region, included in the field of view of the driver or passenger, of the windshield and the driver or passenger can visually recognize the entire image of the display portion or portions easily.

(5) A display unit comprising:

the surface panel according to the above item (1); and the display portion or portions.

According to the display unit having the configuration of item (5), when an image is displayed on the display surface in a state that the display unit is installed in the instrument panel, image projection onto the windshield can be suppressed. When the display portion or portions are not lit, the inside of the surface panel is dark as a whole and hence the display portion or portions can be prevented from being visually recognized by the driver or passenger.

(6) The display unit according to the above item (5), wherein:

the display portion is housed in a recess that is formed in the instrument panel; and an inner wall of the recess serves as a visor.

According to the display unit having the configuration of item (6), even without a meter hood, light going toward the windshield is interrupted by the inner wall of the recess. Thus, because of the absence of a meter hood, the degree of freedom of designing of the instrument panel is increased.

(7) The display unit according to the above item (6), wherein:

plural recesses are formed in such a manner that lines of recesses are arranged like stairs from the driver or passenger seat side to the windshield side;

light sources of the respective display portions are arranged in rows; and the rows of light sources are provided in the respective stairs of the plural recesses.

According to the display unit having the configuration of item (7), even without a meter hood, light going toward the windshield is interrupted by inner walls of the respective recesses that are arranged like stairs. Thus, because of the absence of a meter hood, the degree of freedom of designing of the instrument panel is increased.

(8) The display unit according to the above item (5), wherein the display portions are plural point light sources that are arranged in a base that is laid on a surface of the instrument panel so as to conform to it.

According to the surface panel having the configuration of item (8), the display portions and the surface panel can be disposed so as to conform to the surface of the instrument panel, whereby the degree of freedom of designing of the instrument panel is increased greatly.

(9) The display unit according to the above item (5), wherein the surface panel constitutes part of the instrument panel.

According to the display unit having the configuration of item (9), since the display panel constitutes part of the instrument panel, the driver or passenger can recognize that the display unit is integral with the instrument panel.

(10) An instrument panel comprising the display unit according to the above item (5).

(11) An on-vehicle display device incorporated in a body surface of an instrument panel of a vehicle, comprising:

a base which displays an image parallel with the body surface; and a surface panel which covers a surface of the base and guides the image displayed by the base to a driver or passenger-seat-side part of a vehicle compartment.

According to the on-vehicle display device having the configuration of item (11), since various kinds of information are displayed by the on-vehicle display device which is incorporated in the body surface of the instrument panel which partly defines the vehicle compartment, the driver or passenger would feel integrity between displayed driving-related information and the vehicle. As a result, the efficiency of information transmission to the driver and passenger would be increased. Thus, the driver would be more interested in the display and increased contribution to a safety drive is expected.

(12) The on-vehicle display device according to the above item (11), wherein the on-vehicle display device is incorporated in a driver-seat-side portion of the body surface of the instrument panel.

According to the on-vehicle display device having the configuration of item (12), since the on-vehicle display device is incorporated in the driver-seat-side portion of the instrument panel, various kinds of driving-related information can be conveyed to the driver by displaying them on the on-vehicle display device.

(13) The on-vehicle display device according to the above item (11), wherein the on-vehicle display device is incorporated in a front-passenger-seat-side portion of the body surface of the instrument panel.

According to the on-vehicle display device having the configuration of item (13), information that does not relate to driving, such as entertainment information, can be displayed on the on-vehicle display device incorporated in the front-passenger-seat-side portion of the instrument panel. This makes it possible to display information that is necessary for driving directly and information that is not in such a manner that they are discriminated from each other.

(14) The on-vehicle display device according to the above item (11), wherein a surface of the surface panel is visually recognized as part of the instrument panel when no image is displayed.

According to the on-vehicle display device having the configuration of item (14), when no image is displayed, the driver or passenger would visually recognize the on-vehicle display device as part of the instrument panel. Thus, when an image is displayed, the driver or passenger would recognize it as if it appeared from the vehicle itself. As a result, the driver or passenger could feel integrity between driving-related information and the vehicle more strongly.

(15) An instrument panel comprising the on-vehicle display device according to the above item (11).

(16) An on-vehicle display device incorporated in a body surface of an instrument panel of a vehicle, comprising:

a base which displays an image parallel with the body surface; and a surface panel which covers a surface of the base and guides the image displayed by the base to a driver or passenger-seat-side part of a vehicle compartment, wherein the on-vehicle display device is incorporated so as to extend from a driver or passenger-seat-side portion of the instrument panel to a front end of a windshield.

According to the on-vehicle display device having the configuration of item (16), since various kinds of information are displayed by the on-vehicle display device which is incorporated in the body surface of the instrument panel which partly defines the vehicle compartment, the driver and a passenger would feel integrity between displayed driving-related information and the vehicle. As a result, the efficiency of information transmission to the driver and passenger would be increased. Thus, the driver would be more interested in the display and increased contribution to a safety drive is expected. Furthermore, since the on-vehicle display device extends to the front end of the windshield, a display having a sense of depth can be given to the driver.

(17) The on-vehicle display device according to the above item (16), wherein the base is formed like stairs on the body surface of the instrument panel so as to conform to it.

According to the on-vehicle display device having the configuration of item (17), since the base is formed like stairs, it can easily be shaped so as to conform to the instrument panel.

(18) The on-vehicle display device according to the above item (16), wherein the on-vehicle display device is incorporated in a driver-seat-side portion of the body surface of the instrument panel.

According to the on-vehicle display device having the configuration of item (18), since the on-vehicle display device is incorporated in the driver-seat-side portion of the instrument panel, various kinds of driving-related information can be conveyed to the driver by displaying them on the on-vehicle display device.

(19) The on-vehicle display device according to the above item (16), wherein the on-vehicle display device is incorporated in a front-passenger-seat-side portion of the body surface of the instrument panel.

According to the on-vehicle display device having the configuration of item (19), information that does not relate to driving, such as entertainment information, can be displayed on the on-vehicle display device incorporated in the front-passenger-seat-side portion of the instrument panel. This makes it possible to display information that is necessary for driving directly and information that is not in such a manner that they are discriminated from each other.

(20) The on-vehicle display device according to the above item (16), wherein the on-vehicle display device is incorporated in such a manner that the body surface and a surface of the surface panel constitute approximately the same surface.

According to the on-vehicle display device having the configuration of item (20), since an image is displayed on approximately the same surface as the body surface of the instrument panel, integrity between displayed driving-related information and the vehicle can be obtained.

(21) An instrument panel comprising the on-vehicle display device according to the above item (16).

The invention can increase the degree of freedom for designing a display unit and an instrument panel, and lower the degree of image projection onto a windshield to such a level that it does not affect driving.

The invention has been described above concisely. The details of the invention will become more apparent when the modes for carrying out the invention (hereinafter referred to as embodiments) described below are read through with reference to the accompanying drawings.

BRIEF DESCRIPTION OF THE DRAWINGS

FIG. 15A shows a display example that is made at the occurrence of an excessive speed, and FIG. 15B shows a display example as an alarm indicating approach of another vehicle.

FIG. 19A shows a display example of a case that music is listened to using entertainment information, and FIG. 19B shows a display example that is made at the occurrence of an excessive speed.

FIG. 26A shows a display example of a case that music is listened to using entertainment information, and FIG. 26B shows a display example that is made at the occurrence of an excessive speed.

DETAILED DESCRIPTION OF EMBODIMENTS

Embodiment 1

A surface panel according to a first embodiment will be hereinafter described with reference to the drawings. The surface panel according to this embodiment serves to prevent or lower the degree of projection, onto a windshield, of an image of a display that is installed in a vehicle instrument panel.

Figure 1:
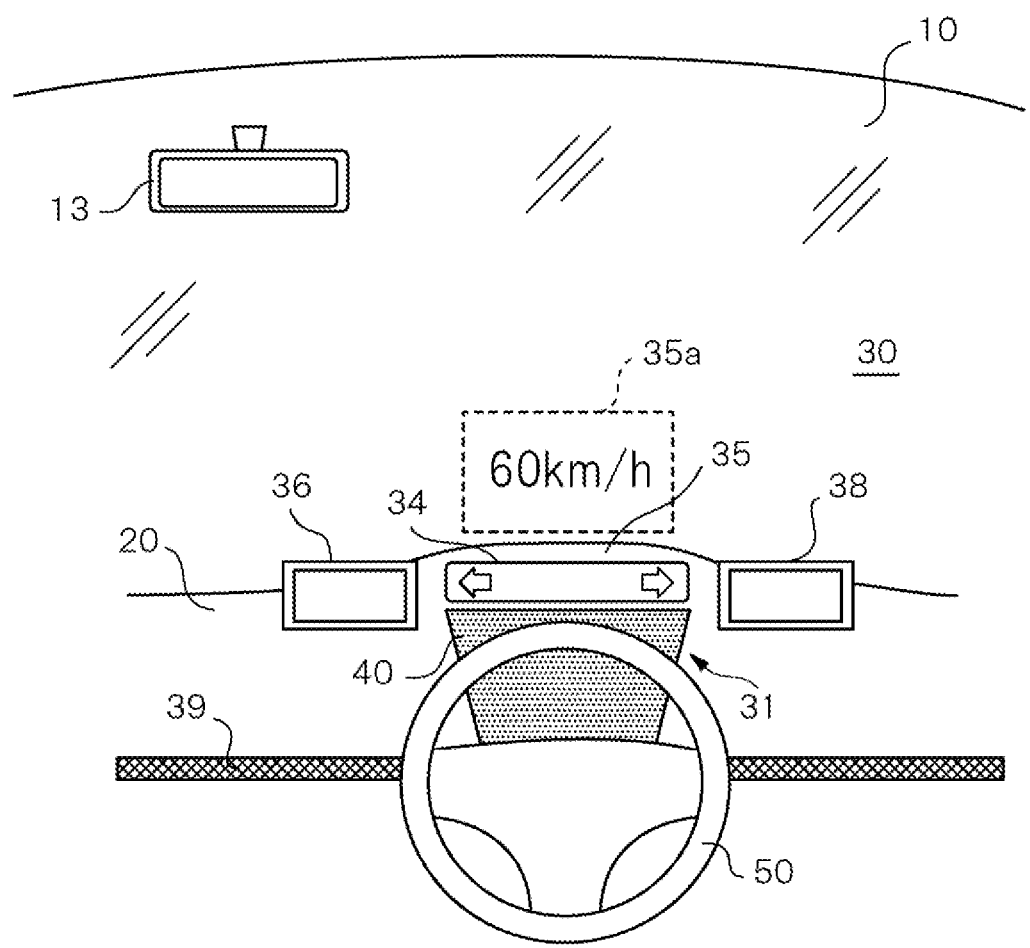
FIG. 1 is a front view showing an appearance of a vehicle instrument panel to which a surface panel 40 according to a first embodiment is attached.

FIG. 1 is a front view showing an appearance of a vehicle instrument panel 20 to which a surface panel 40 according to the first embodiment is attached. A windshield 10, a front mirror 13, the instrument panel 20, various displays 30, a steering wheel 50, etc. are disposed in a part, viewable from the driver seat side, of the vehicle compartment.

All of the various displays 30 are installed on or in the instrument panel 20. Among the various displays 30, a display unit 31 which is equipped with at least a display portion 32 and the surface panel 40 is disposed at a front-center position, closest to the steering wheel 50 and easy to see to a driver 55 (see FIG. 2), of the instrument panel 20. The display unit 31 is equipped with the display portion 32 in which plural LED light sources (point light sources) are arranged on a flat mount base, and displays entertainment information, an alarm, meter information, navigation information, and other information on the screen. The surface panel 40 is attached to the instrument panel 20 so as to cover the display screen of the display portion 32.

A pair of liquid crystal displays 36 and 38 are disposed on the two respective sides of the display unit 31, The liquid crystal displays 36 and 38 display such information as a battery voltage, a traveling distance meter, an engine tachometer, and a fuel meter.

A high-mount display 34 is disposed on the top surface of the instrument panel 20. The high-mount display 34 displays, for example, blinker images.

A head-up display 35 for projection onto the windshield 10 is disposed on the top surface of the instrument panel 20 near the windshield 10. The head-up display 35 displays speed information etc. in a region 35a, easy to recognize visually to the driver 55, on the windshield 10. In FIG. 1, a speed "60 km/h" is projected.

A line illuminator 39 is disposed below the display unit 31 of the instrument panel 20 so as to extend in the left-right direction. The line illuminator 39 lights up at the time of, for example, starting so as to produce a flow in the left-right direction and thereby notifies the driver of the starting. When another vehicle or obstacle is approaching from the right side or left side of the vehicle, it is possible to have the driver recognize the approach of the other vehicle or obstacle from the right side or left side of the vehicle by causing the line illuminator 39 to light up so as to produce a rightward or leftward flow.

Figure 2:
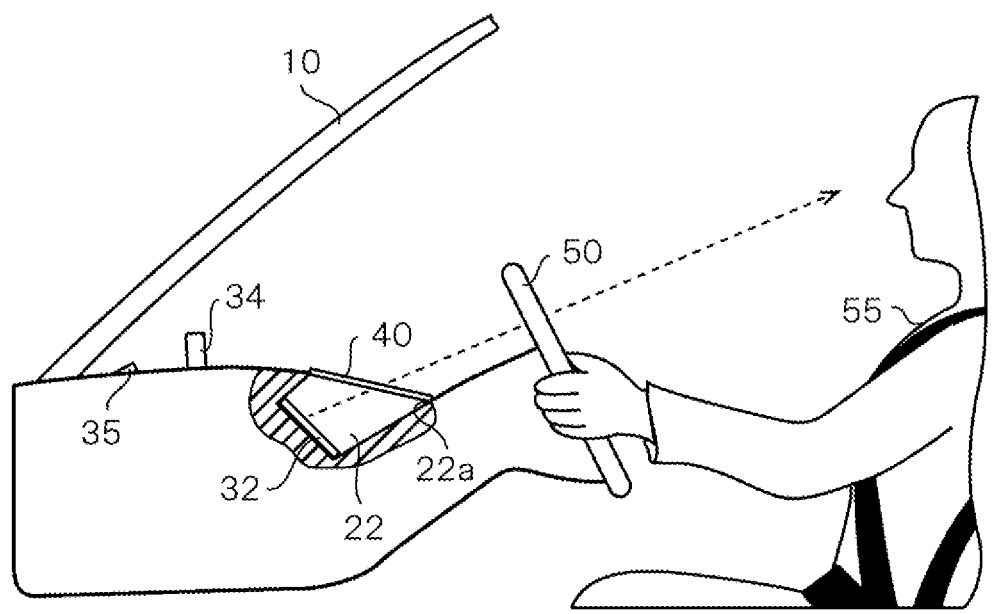
FIG. 2 a partially cutaway sectional view of an instrument panel 20 and its neighborhood as viewed in such a manner that a driver-seat-side part of the vehicle compartment is viewed from the side.

FIG. 2 is a partially cutaway sectional view of the instrument panel 20 and its neighborhood as viewed in such a manner that a driver-seat-side part of the vehicle compartment is viewed from the side. A front-center portion of the instrument panel 20 is formed with a recess 22 which is inclined obliquely. The display portion 32 of the display unit 31 is housed in the recess 22 on its bottom surface. The surface panel 40 is attached to a peripheral portion 22a of the recess 22 without forming any gaps so as to cover the display portion 32 of the display unit 31. An inner wall of the recess 22 serves as a visor member for preventing projection of an image of the display unit 31 onto the windshield 10.

Figure 3A:
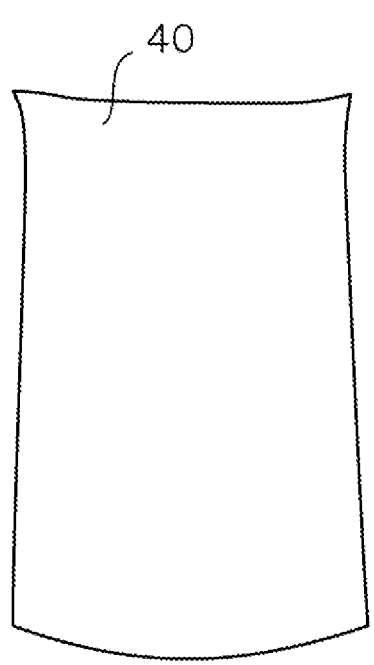
FIG. 3A shows a shape of the surface panel 40 which is attached to the instrument panel 20 so as to cover a display portion 32 of a display unit 31.

FIG. 3A shows a shape of the surface panel 40 which is attached to the instrument panel 20 so as to cover the display portion 32. The surface panel 40 interrupts part of light L emitted from the display portion 32 so that an image of the display portion 32 can be seen only from a particular direction (i.e., from the driver) and is not projected onto the windshield 10. Where as shown in FIGS. 2 and 3C the surface panel 40 is distant from the display portion 32, the external size of the surface panel 40 is larger than that of the display portion 32. Where the surface panel 40 is disposed near the display portion 32, the external size of the surface panel 40 may be approximately equal to that of the display portion 32.

In the embodiment, the surface panel 40 is made of a metal material such as aluminum, stainless steel, or an alloy. Alternatively, the surface panel 40 may be a mold of a resin material such as an acrylic or a fiber-reinforced plastic.

The display portion 32 may have another configuration that employs TFTs or an organic EL panel. Presence/absence of the recess 22 and the distance between the display portion 32 and the surface panel 40 can be determined or set freely.

Figure 3B:
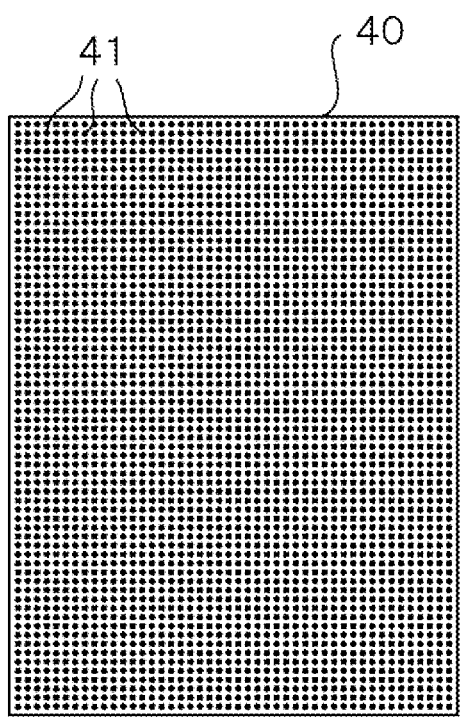
FIG. 3B is an enlarged view of part of the surface of the surface panel 40.
Figure 3C:
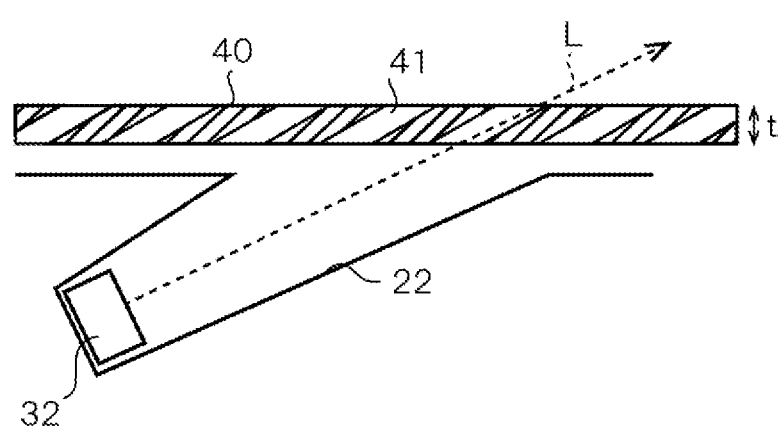
FIG. 3C illustrates shapes of the small apertures 41 formed through the surface panel 40.

FIG. 3B is an enlarged view of part of the surface of the surface panel 40. The surface panel 40 is formed with innumerable small apertures 41. In the embodiment, the openings of the small apertures 41 are circular.

FIG. 3C illustrates shapes of the small apertures 41 formed through the surface panel 40. As mentioned above, the display portion 32 is disposed on the bottom surface of the recess 22 which is formed so as to extend obliquely from the surface of the instrument panel 20. To facilitate understanding, FIG. 3C is drawn schematically. Light L emitted from the display surface of the display portion 32 is projected so as to travel in the inclination direction of the recess 22.

To guide light L emitted from the display portion 32 to the driver seat side, the inner surfaces of the small apertures 41 which are formed through the surface panel 40 have such prescribed angles with respect to the thickness direction of the surface panel 40 that their axial lines are directed toward the driver seat side (or passenger seat side). The inclination angles of the axial lines of the small apertures 41 with respect to the direction of the thickness t of the surface panel 40 are set small on the driver seat side and large on the windshield 10 side. In a region where the surface of the surface panel 40 faces toward the driver seat side, the inclination angles are set at approximately equal to 0°.

Figure 4A:
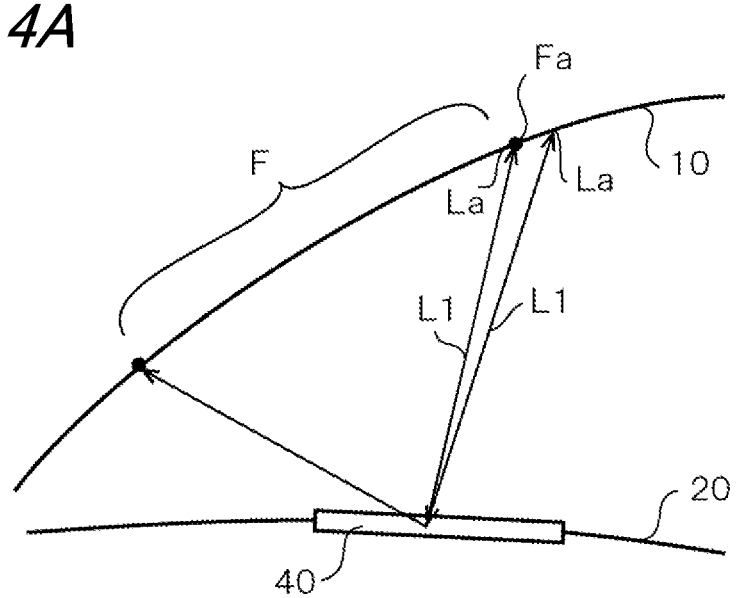
FIG. 4A illustrate how to determine the inclination angles of the small apertures 41.
Figure 4B:
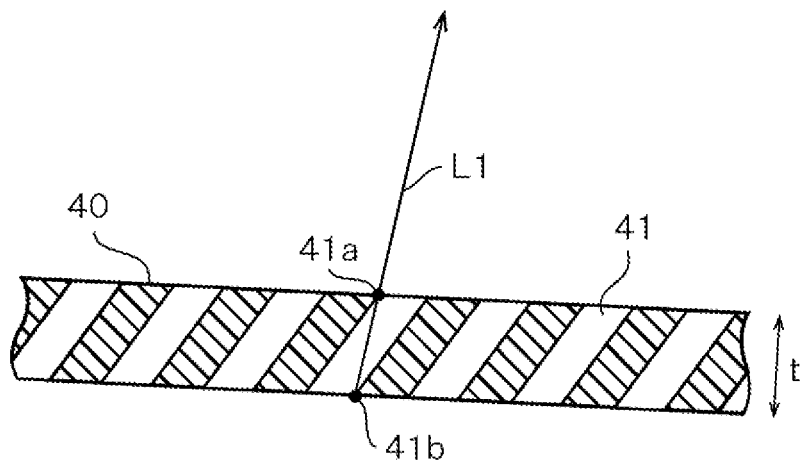
FIG. 4B is an enlarged view of small apertures 41.

The inclination angles of the small apertures 41 will now be described in detail. FIG. 4A illustrate how to determine the inclination angles of the small apertures 41. FIG. 4B is an enlarged view of small apertures 41. A range of the windshield 10 that is included in a field of view of the driver 55 is denoted by F; it is desirable that the inclination angles of the small apertures 41 be set so that an image of the display unit 31 is not projected in the range F.

Now assume a highest point Fa of the entire windshield 10 or the range F in which image projection is desired to be prevented. To prevent image projection in the entire windshield 10, the highest point Fa is set at the top point of the windshield 10. Also assume a top point 41a and a bottom point 41b of each small aperture 41 as points located on the windshield 10 side and the driver seat side, respectively; the top point 41a is a point on the driver-55-side one of the opening edges of the small aperture 41 and the bottom point 41b is a point on the display-unit-32-side opening edge.

A line L1 connecting the top point 41a and the bottom point 41b is defined, and a point La is defined as a point where an extension of the line L1 intersects the windshield 10. It is desirable that the inclination of the small aperture 41 be set so that the intersecting point La is higher than the highest point Fa, that is, located outside the range F. If the point La were located inside the range F, light L emitted from the display portion 32 would go along the like L1 and an image of the display unit 31 would be projected in the range F where image projection is desired to be prevented.

Since the range of the angle of emergence of light L emitted from the display portion 32 is restricted in the above-described manner, even a ray of the light L having a smallest inclination angle with respect to the thickness t direction of the surface panel 40 reaches the windshield 10 at a position located above the highest point Fa of the range F. Thus, an image of the display unit 31 is not projected inside the range F where image projection is desired to be prevented.

The inclination angles of the small apertures 41 vary depending on the positional relationship between the windshield 10 and the surface panel 40 and the installation angle of the surface panel 40. For example, on the side where the surface panel 40 is close to the windshield 10, the inclination angles are large because the horizontal distances between the highest point Fa and the small apertures 41 are long. That is, the small apertures 41 are formed in the surface panel 40 in such a manner that their inclination angles are small on the driver seat side and large on the windshield 10 side. Since it takes much time and labor to form the small apertures 41 by machining while varying their inclination angles one by one, the inclination angles may be varied in groups.

As mentioned above, the surface panel 40 is attached to the instrument panel 20 of the vehicle so as to cover the display portion 32 which is installed in the instrument panel 20. When the display unit 31 is lit, light L emitted from the display portion 32 passes through the small apertures 41 formed through the surface panel 40 and projected toward the driver seat side. No part of the light L is projected in the range F where image projection is desired to be prevented, there does not occur a phenomenon that an image of the display unit 31 projected onto the windshield 10 is included in a field of view of the driver and annoys the driver.

When the display unit 31 is not lit, since almost no external light enters the inside of the surface panel 40, from the driver side the surface panel 40 looks merely as if to be part of the instrument panel 20 and the driver cannot visually recognize the presence of the display portion 32 inside the surface panel 40. Thus, when the display unit 31 is lit, an image is displayed as if to be highlighted to cause the driver feel unexpected or give him or her a strong impression.

As described above, by attaching the surface panel 40 to the instrument panel 20, image projection onto the windshield that would otherwise obstruct driving can be suppressed without impairing the design performance of the display unit 31.

By attaching the surface panel 40, a phenomenon can be prevented that external light (direct sunlight, light coming from a room light, etc.) directly shines on the display portion 32 to render an image of the display portion 32 less viewable. When the display unit 31 is not lit, the inside of the surface panel 40 is dark as a whole and hence the display portion 32 existing inside is not seen. Thus, even when the display unit 31 is not lit, a novel design can be provided only by the instrument panel 20 and the surface panel 40.

Since the surface panel 40 is formed with the small apertures 41, it is possible to allow the driver 55 to recognize an image of the display unit 31 clearly by utilizing the pinhole effect.

Furthermore, a good field of view can be secured because the inclination angles of the small apertures 41 are set so that an image of the display unit 31 is not projected in the range F of the windshield 10 that is included in a field of view of the driver 55 and hence the image of the display unit 31 is not projected there.

Still further, by varying the inclination angles of the small apertures 41, light passing through none of the small apertures 41 formed through the surface panel 40 reaches the range F of the windshield 10 that is included in a field of view of the driver.

Embodiment 2

In a windshield-10-side peripheral portion of the display unit 31, the inner wall of the recess 22 formed in the instrument panel 20 serves as a visor member, whereby light going toward the windshield 10 is also interrupted by the visor member. Thus, the degree of projection of an image of the display unit 31 onto the windshield 10 can be lowered further. And absence of a meter hood increases the degree of freedom of designing of the instrument panel 20.

Whereas the above-described first embodiment is directed to the display unit in which the plural LED light sources are arranged on the flat mount base, a second embodiment is directed to a display unit that is equipped with an LED circuit body that is laid on the surface of the instrument panel so as to conform to it from a front portion, located on the driver seat side, of the instrument panel to a position close to the windshield.

Constituent elements having the same ones in the first embodiment will be given the same symbols as the latter, and descriptions therefor will be omitted.

Figure 5:
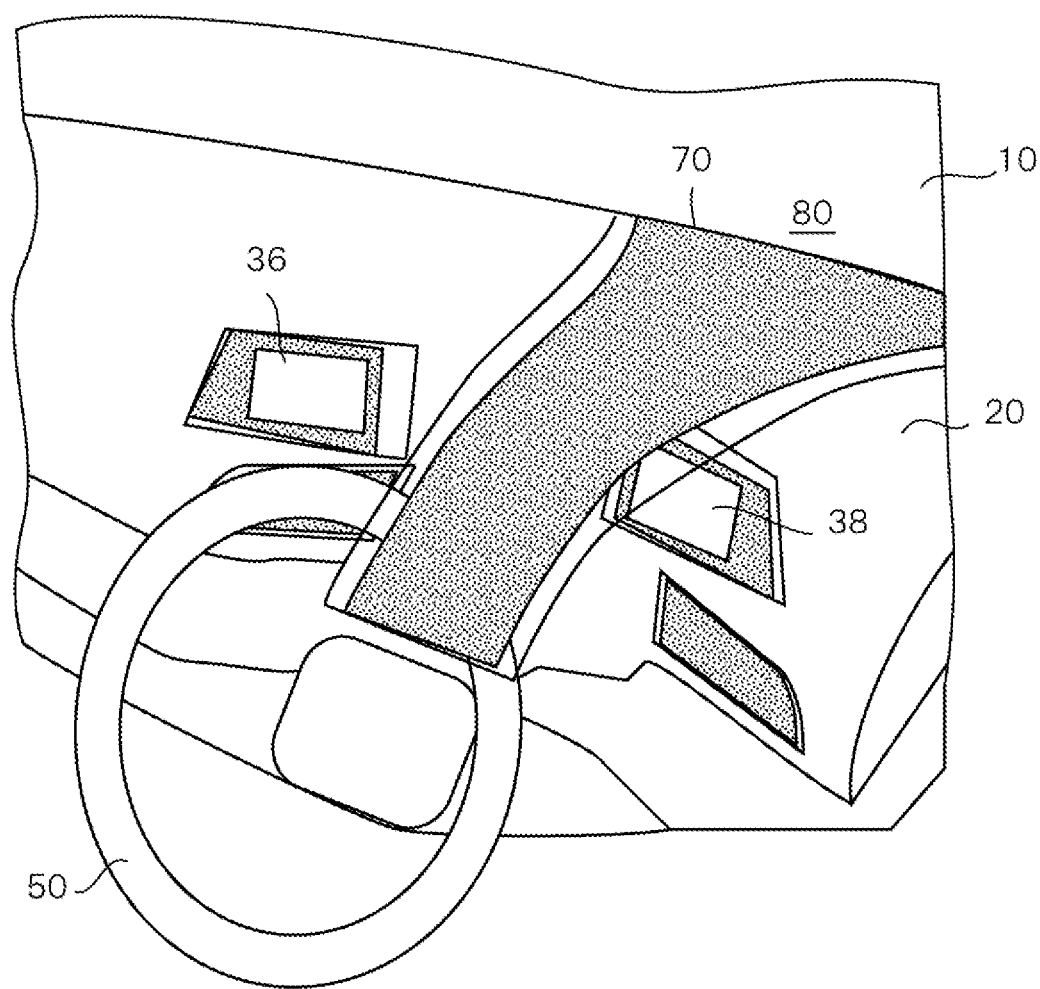
FIG. 5 is a perspective view showing an appearance of the instrument panel 20 on which a display unit 80 according to a second embodiment including an LED circuit body 60 and a surface panel 70 is laid.
Figure 6:
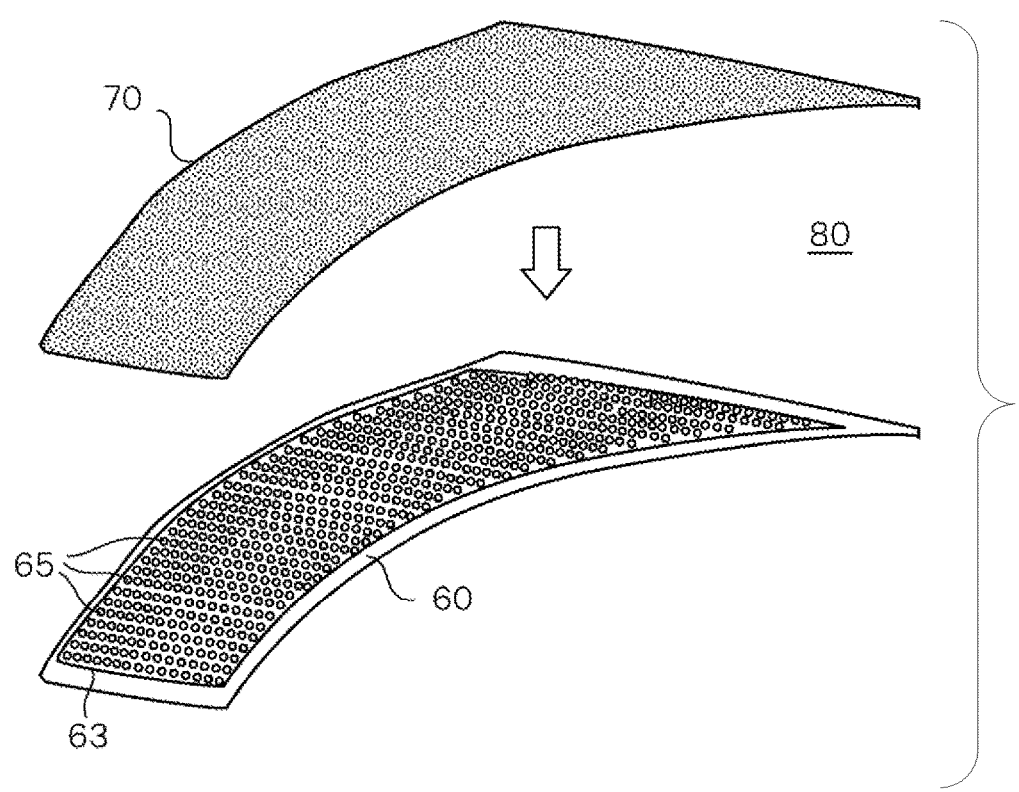
FIG. 6 is a perspective view showing an appearance of the LED circuit body 60 and the surface panel 70 laid thereon.

FIG. 5 is a perspective view showing an appearance of the instrument panel 20 on which a display unit 80 according to the second embodiment including an LED circuit body 60 and a surface panel 70 is laid. FIG. 6 is a perspective view showing an appearance of the LED circuit body 60 and the surface panel 70 laid thereon.

In the LED circuit body 60, plural lines of LED light sources (point light sources) 65 are arranged on a mount base 63 like stairs. The surface panel 70 is shaped so as to be able to be laid on the LED circuit body 60. The display unit 80 produces a display having a sense of depth because the surface panel 70 is laid on the LED circuit body 60. The surface panel 70 and the instrument panel 20 form an integral surface. As such, the surface panel 70 is visually recognized as part of the instrument panel 20 by the driver. The mount base 63 is a PCB (printed circuit board). The mount base 63 may be flexible and disposed on the curved surface of the instrument panel 20 without any gaps.

Figure 7:
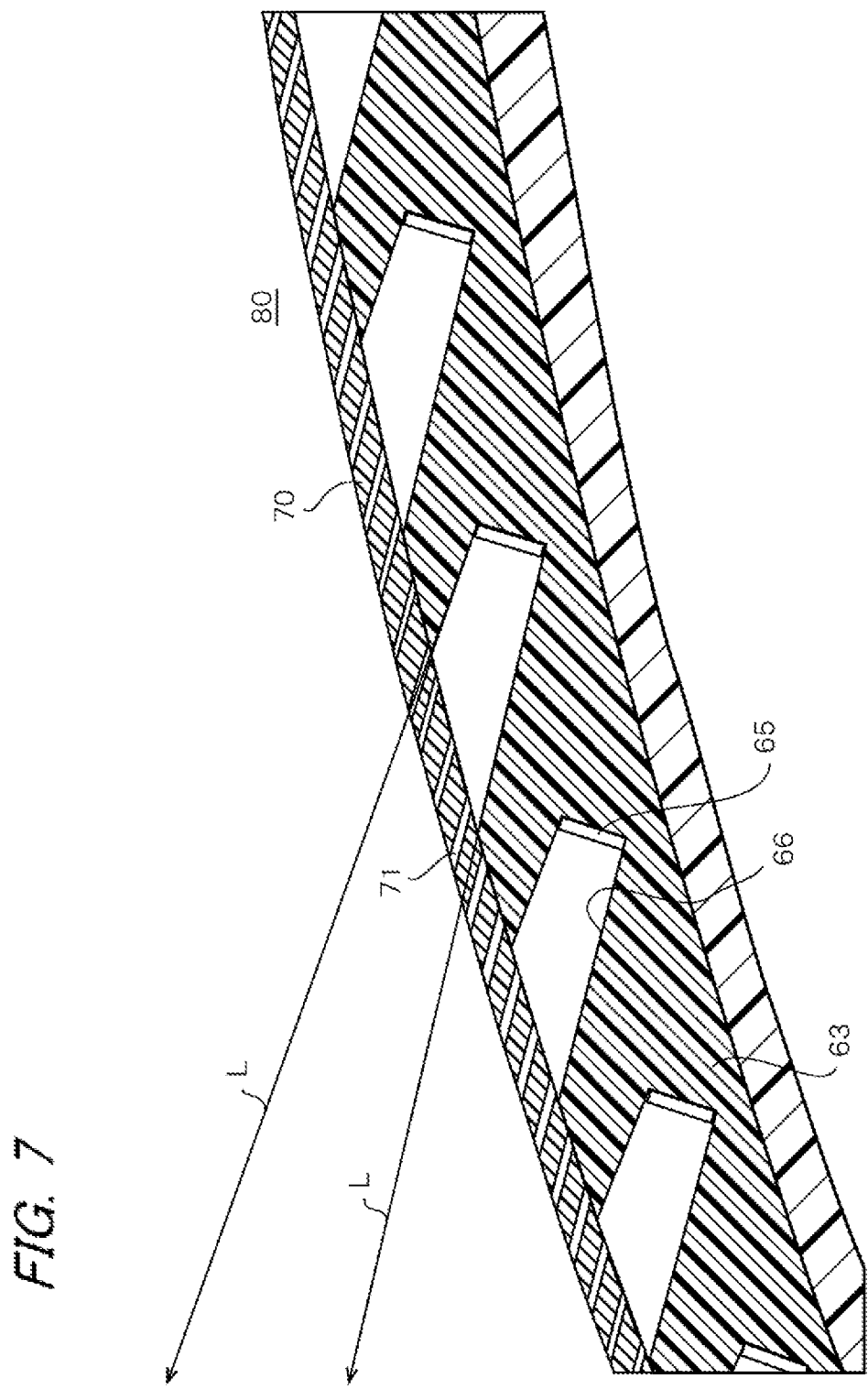
FIG. 7 is an enlarged sectional view of part of the display unit 80 and shows its structure.

The surface panel 70 is laid on and combined with the LED circuit body 60 to form the integrated display unit 80. FIG. 7 is an enlarged sectional view of part of the display unit 80 and shows its structure.

The surface of the mount base 63 is formed with a large number of holes 66 (stairs) which are open to the driver seat side. The large number of holes 66 are formed in such a manner that lines of holes 66 are arranged like stairs from the driver seat side to the windshield 10. The LED light sources 65 are disposed on the bottom surfaces of the holes 66, respectively. Thus, the LED light sources 65 are arranged in rows.

Plural small apertures 71 are formed through the surface panel 70 in such a manner that light beams L emitted from the LED light sources 65 and exit the plural holes 66, respectively, travel toward the driver seat side. The number of small apertures 71 per LED light source 65 is about six to nine. The small apertures 71 have prescribed angles with respect to the thickness direction of the surface panel 70. The inclination angle of the small aperture 71 decreases as the position comes closer to the driver seat, that is, increases as the position comes closer to the windshield 10. In a region where the surface of the surface panel 70 faces toward the driver seat side, the inclination angles are set at approximately equal to 0°. An inner wall of each hole 66 also serves as a visor member for preventing light L emitted from the associated LED light source 65 from going toward the windshield 10.

Figure 8:
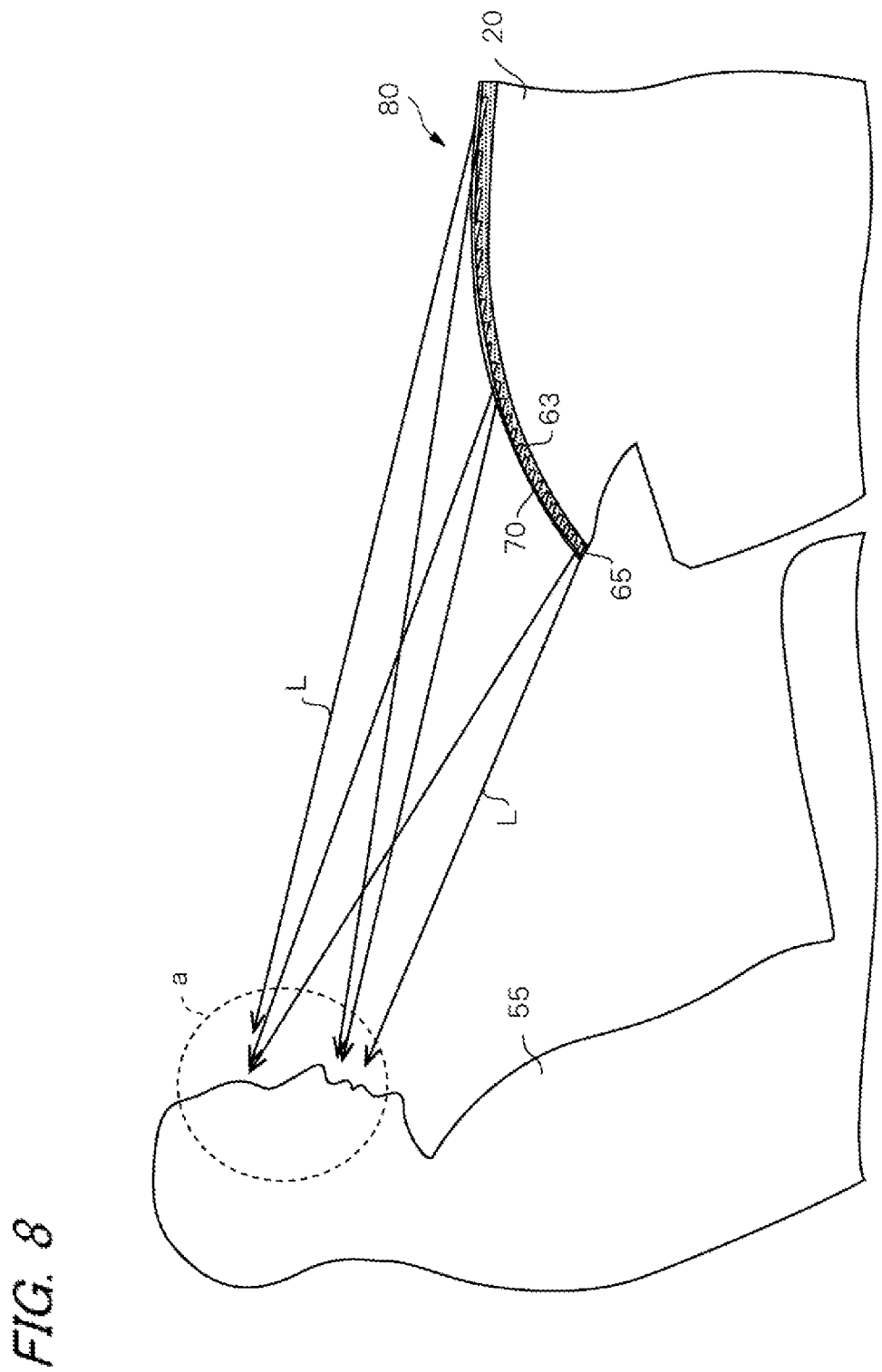
FIG. 8 illustrates a traveling direction of light L that is projected from each of LED light sources 65 arranged in a mount base 63.

FIG. 8 illustrates a traveling direction of light L that is projected from each of the LED light sources 65 arranged in the mount base 63. Where the surface panel 70 is disposed in the manner shown in FIG. 8, the inclination angle of the small aperture 71 formed through the surface panel 70 increases gradually as the position goes from the driver seat side to the front end of the windshield 10. Thus, light beams L emitted from all of the LED light sources 65 arranged in the LED circuit body 60 travel toward the face (refer to a broken-line frame a) of the driver 55 who is sitting in the driver seat. The driver 55 can therefore get light beams coming from all of the LED light sources 65 without the need for changing the direction of his or her line of sight.

Since as described above the LED light sources 65 are arranged in the mount base 63 continuously from the driver seat side to the front end of the windshield 10, the display unit 80 having the structure that the surface panel 70 is laid on the LED circuit body 60 can produce a display having a sense of depth when lit. When the display unit 80 is not lit, since the LED circuit body 60 is hidden behind the small aperture 71 of the surface panel 70, the driver do not likely become aware of the presence of the LED circuit body 60.

According to the second embodiment, the display unit 80 which is composed of the LED circuit body 60 and the surface panel 70 can be disposed parallel with the surface of the instrument panel 20 without any gaps and hence can enhance the design performance of the instrument panel 20. And a round display having a sense of depth can be realized that appears only when lit. As such, the display unit 80 can cause the driver and a passenger to feel unexpected or give him or her an impression of novelty.

Embodiment 3

A third embodiment is directed to a case that a display unit is disposed at a location of the instrument panel where a meter panel is installed conventionally. Constituent elements having the same ones in the first embodiment will be given the same symbols as the latter, and descriptions therefor will be omitted.

Figure 9:
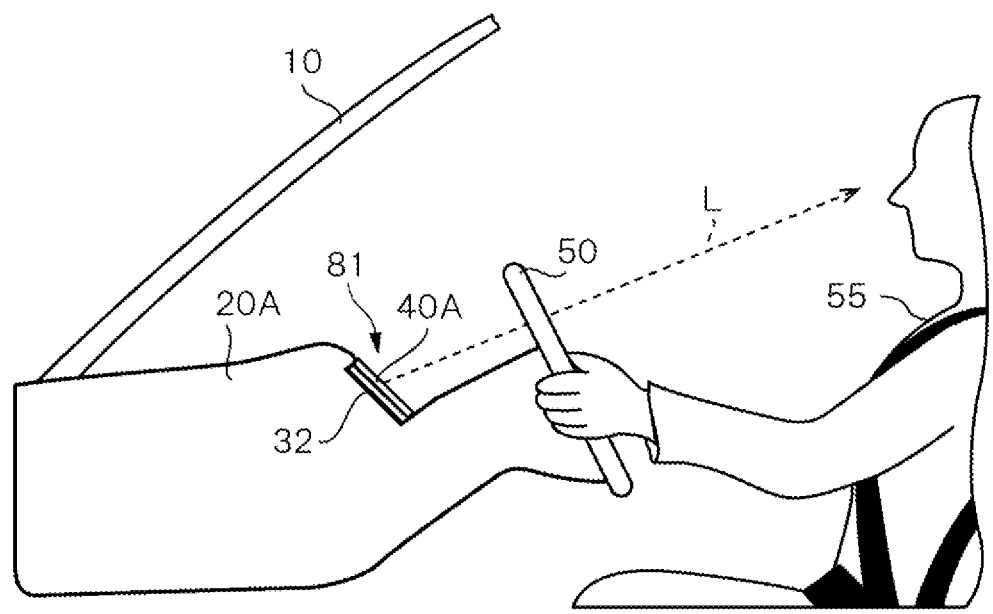
FIG. 9 is a view of an instrument panel 20A according to a third embodiment and its neighborhood as viewed in such a manner that a driver-seat-side part of the vehicle compartment is viewed from the side.

FIG. 9 is a view of an instrument panel 20A according to the third embodiment and its neighborhood as viewed in such a manner that a driver-seat-side part of the vehicle compartment is viewed from the side. A display unit 81 is installed on a driver-seat-side front surface of the instrument panel 20A. The display unit 81 is installed so as to be approximately flush with the surface of the instrument panel 20A.

A surface panel 40A has approximately the same shape as the above-described surface panel 40 according to the first embodiment and is disposed on the surface of a display portion 32. Although in FIG. 9 the surface panel 40A is disposed close to the surface of the display portion 32, the former may be disposed so as to be distant from the latter as in the first embodiment. The inclination angles of small apertures formed through the surface panel 40A are set so as to satisfy the condition shown in FIG. 4A, That is, a measure is taken so that light emitted from each LED light source does not travel toward the range F of the windshield 10 where image projection is desired to be prevented. Unlike in conventional vehicles, it is not necessary to install a meter hood on top of a meter panel to prevent image projection onto the windshield 10.

In the instrument panel 20A to which the surface panel 40A is attached, since as described above the display unit 81 is disposed at a position that is closer to the driver seat, the driver 55 can view the display unit 81 having a large screen. Even when the display unit 81 is lit, the surface panel 40A can suppress projection of an image of the display unit 81 in the range F of the windshield 10 where image projection is desired to be prevented. When the display unit 81 is not lit, the surface panel 40A hides the display portion 32.

By attaching the surface panel 40A in the above-described manner, projection of an image of the display unit 81 onto the windshield 10 can be prevented even if a meter hood 21 is not installed or is smaller than in conventional cases. Furthermore, since the meter hood 21 can be omitted or made smaller, the instrument panel 20A can be given a novel design.

Although this embodiment is directed to the case that the display portion 32 is disposed without forming a recess 22, the display portion 32 may be disposed in a recess 22. Furthermore, a meter hood may be formed on a driver-seat-side front surface of the instrument panel 20A.

The technical scope of the invention is not limited to the above embodiments. Various modifications, improvements, etc. can be made of the above embodiments within the technical scope of the invention.

For example, the surface panel may be configured so as to be either attached to the instrument panel or attached to a display and integrated with it to form a display unit. Furthermore, the surface panel may be molded integrally with the instrument panel.

Although in the above embodiments the openings of the small apertures are circular, the invention is not limited to that case; the openings of the small apertures may be, for example, elliptical or polygonal. As a further alternative, the openings of the small apertures may be shaped like slits that are longer in a direction that is perpendicular to the depth direction.

In the above embodiments, the surface panel is formed with the small apertures but no pictures, patterns, etc. are drawn on its surface. If such a surface panel looks poor in design performance, various things may be drawn on its surface to enhance its design performance.

Although the above embodiments are directed to the case of preventing an image of the display unit from being projected onto the windshield, surface panels may likewise be installed for other displays.

Embodiment 4

An on-vehicle display device according to a fourth embodiment will be hereinafter described with reference to the drawings. The on-vehicle display device according to this embodiment is employed as a display unit which is incorporated in the surface of the instrument panel as its part.

Figure 10:
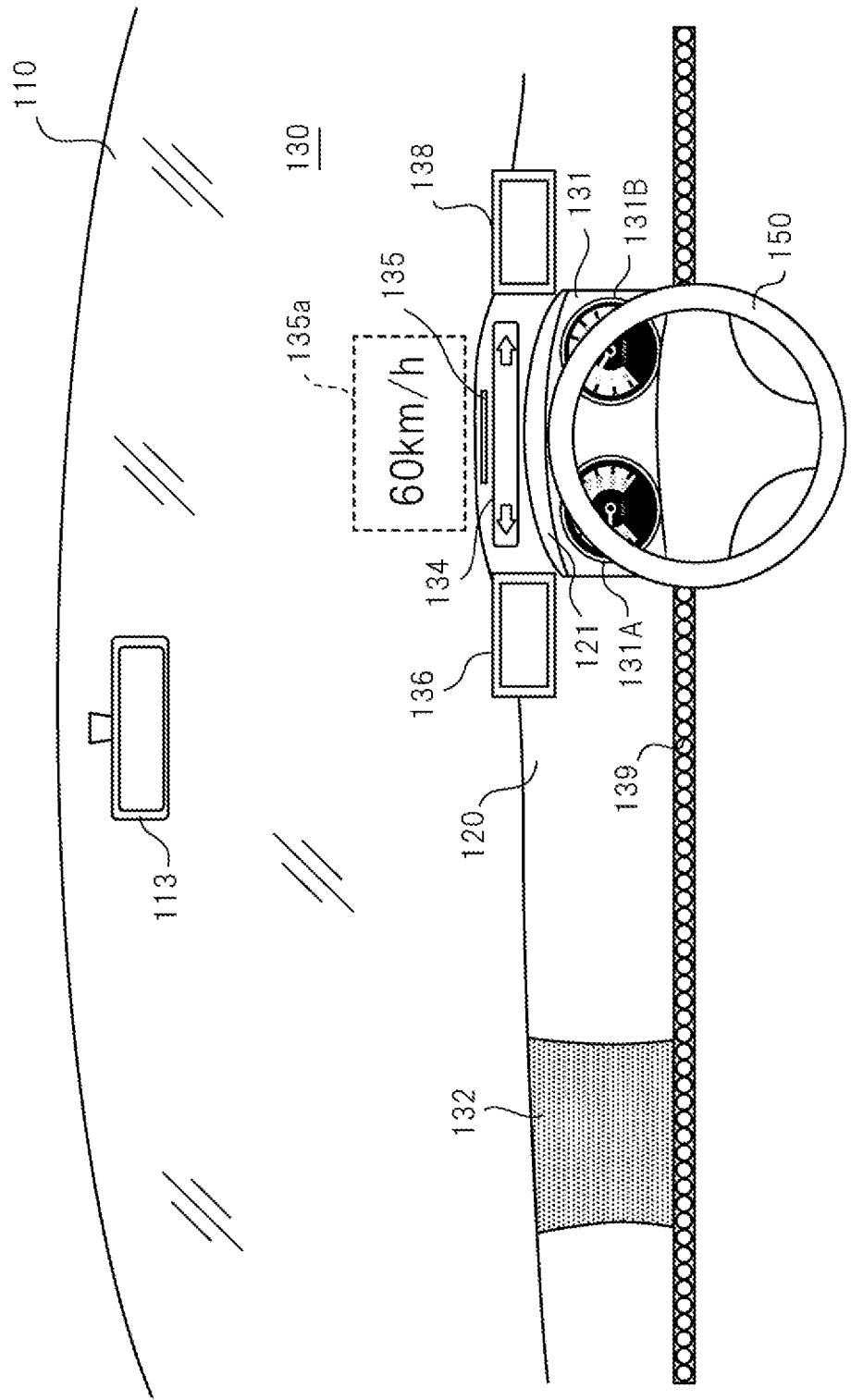
FIG. 10 is a front view showing an appearance of an instrument panel 120 incorporating a display unit 132 which is an on-vehicle display device according to a fourth embodiment and its neighborhood.

FIG. 10 is a front view showing an appearance of an instrument panel 120 incorporating a display unit 132 which is an on-vehicle display device according to the fourth embodiment and its neighborhood.

A windshield 110, a front mirror 113, the instrument panel 120, various display devices 130, a steering wheel 150, etc. are disposed in a part, viewable from the driver seat side, of the vehicle compartment.

Among the various display devices 130, a meter display 131 is disposed at a front-center position, closest to the steering wheel 150 and easy to see to the driver, of the instrument panel 120. The meter display 131 displays a speedometer 131A, an engine tachometer 31B, etc. The instrument panel 120 is formed with a meter hood 121 which serves as a visor for the meter display 131.

A pair of liquid crystal displays 136 and 138 are disposed on the two respective sides of the meter display 131. The liquid crystal displays 136 and 138 display various kinds of information such as driving-related information, danger announcement information, navigation information, and entertainment information.

A high-mount display 134 is disposed on the top surface of the instrument panel 120. The high-mount display 134 displays, for example, blinker images.

A head-up display 135 for projection onto the windshield 110 is disposed on the top surface of the instrument panel 120 near the windshield 110. The head-up display 135 displays speed information etc. in a region 135a, easy to recognize visually to the driver, on the windshield 110. In FIG. 10, a speed "60 km/h" is projected.

A line illuminator 139 is disposed below the meter display 131 of the instrument panel 120 so as to extend in the left-right direction. The line illuminator 139, in which plural LED light sources are arranged in the left-right direction, lights up so as to produce, for example, a flow in the left-right direction and thereby gives the driver an impression of novelty.

On the other hand, the display unit 132 is incorporated in a front-passenger-seat-side front surface of the instrument panel 120. The display unit 132 extends parallel with the surface of the instrument panel 120 without any gaps from a front-passenger-seat-side front portion of the instrument panel 120 to a position close to the front end of the windshield 110, and is incorporated in the instrument panel 120 so as to form approximately the same surface as the body surface of the instrument panel 120.

Figure 11:
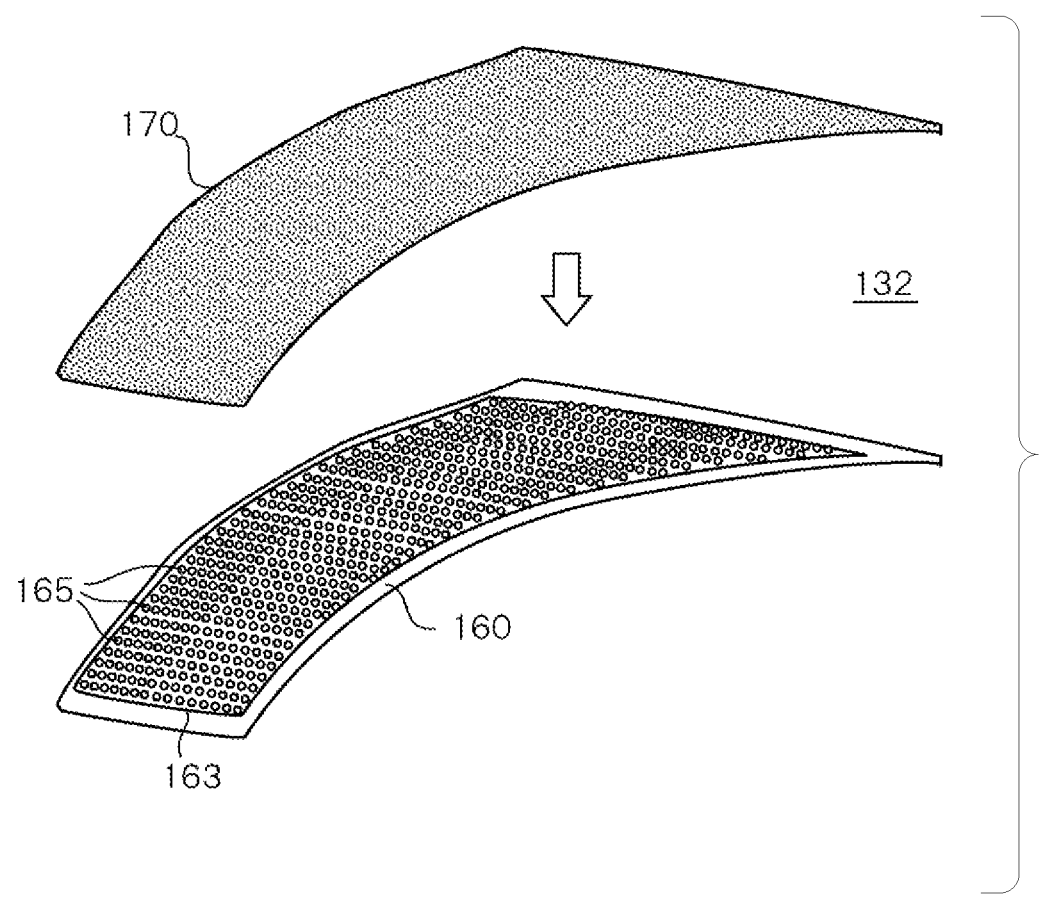
FIG. 11 is a perspective view showing the structure of the display unit 132.

FIG. 11 is a perspective view showing the structure of the display unit 132. The display unit 132 is a display device that extends from a front portion of the instrument panel 120 to a position close to the front end of the windshield 110 and thus produces a display having a sense of depth. And the display unit 132 has a structure that a surface panel 170 is laid on an LED circuit body 160.

In the LED circuit body 160, plural lines of LED light sources (point light sources) 165 are arranged on a flexible mount base 163 like stairs. The mount base 163 may be molded with a flexible material so as to conform to the curved surface of the instrument panel 120. On the other hand, the surface panel 170 has such a curved shape as to be laid on the LED circuit body 160. As described later, plural small apertures 171 (see FIG. 12) are formed through the surface panel 170 for the LED light sources 165.

Figure 12:
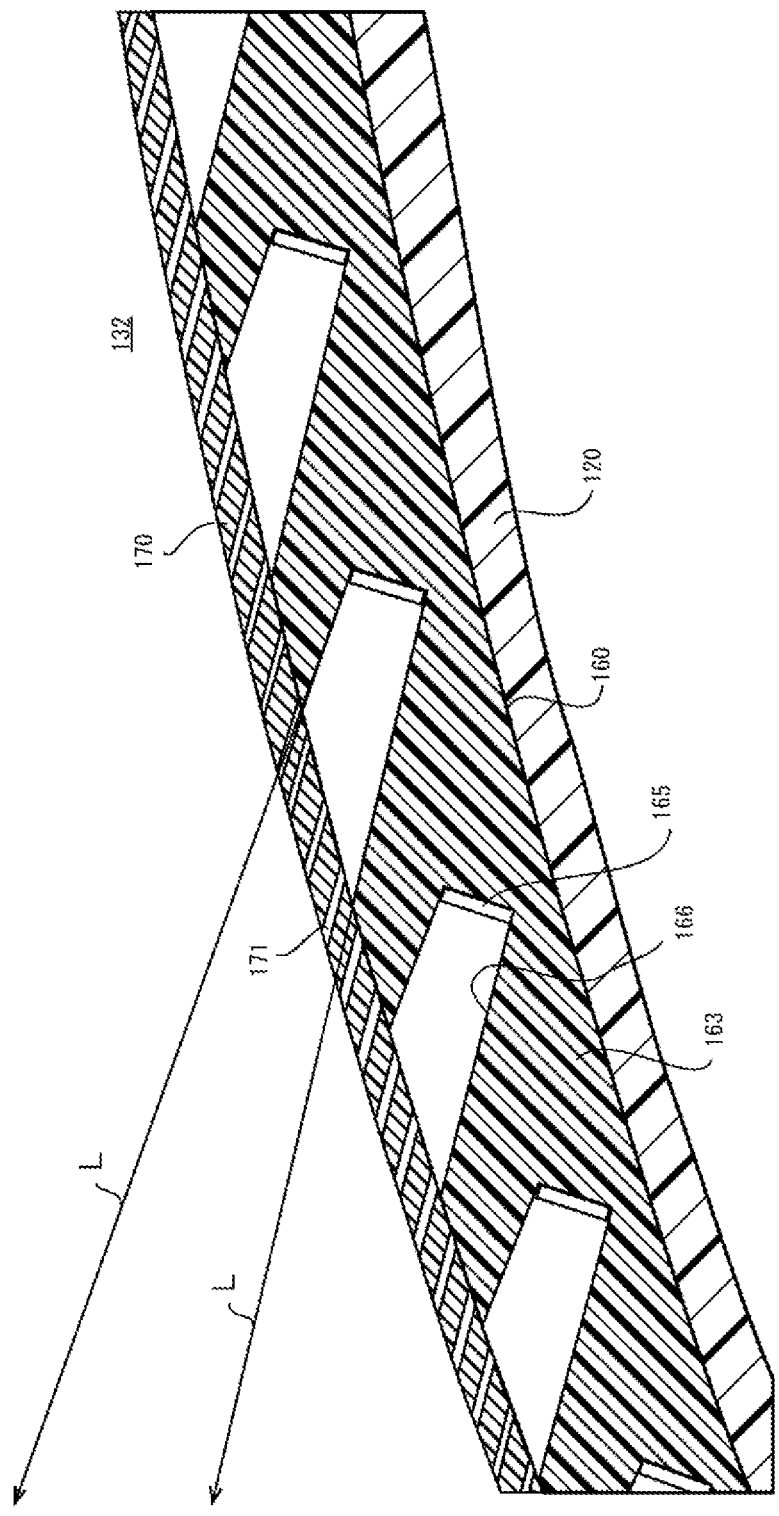
FIG. 12 is an enlarged sectional view of part of the display unit 132 and shows its structure.

FIG. 12 is an enlarged sectional view of part of the display unit 132. The surface of the mount base 163 is formed with a large number of holes 166 (stairs) which are open to the driver seat side. The LED light sources 165 are disposed on the bottom surfaces of the holes 166, respectively.

The plural small apertures 171 are formed through the surface panel 170 in such a manner that light beams L emitted from the LED light sources 165 and exit the plural holes 166, respectively, travel toward the front passenger seat side. The number of small apertures 171 per LED light source 165 is about six to nine. The small apertures 171 have prescribed angles with respect to the thickness direction of the surface panel 170. The inclination angle of the small aperture 171 decreases as the position comes closer to the front passenger seat, that is, increases as the position comes closer to the windshield 110. In a region where the surface of the surface panel 170 is perpendicular to the direction to the front passenger seat side, the inclination angles of the small aperture 171 may be set at approximately equal to 0°.

The holes 166 are also inclined with respect to the thickness direction of the mount base 163, and their inclination angle, like the inclination angle of the small apertures 171, decreases as the position comes closer to the front passenger seat, that is, increases as the position comes closer to the windshield 110. An inner wall of each hole 66 also serves as a visor member for preventing light L emitted from the associated LED light source 165 from going toward the windshield 110.

As described above, the inner walls of the holes 166 and the small apertures 171 of the surface panel 170 have a light guiding function of guiding light beams emitted from the LED light sources 165 disposed in the mount base 163 to the front passenger seat side in the vehicle compartment. The light guiding function may be realized only by the inner walls of the holes 166 or the small apertures 171 of the surface panel 170.

Figure 13:
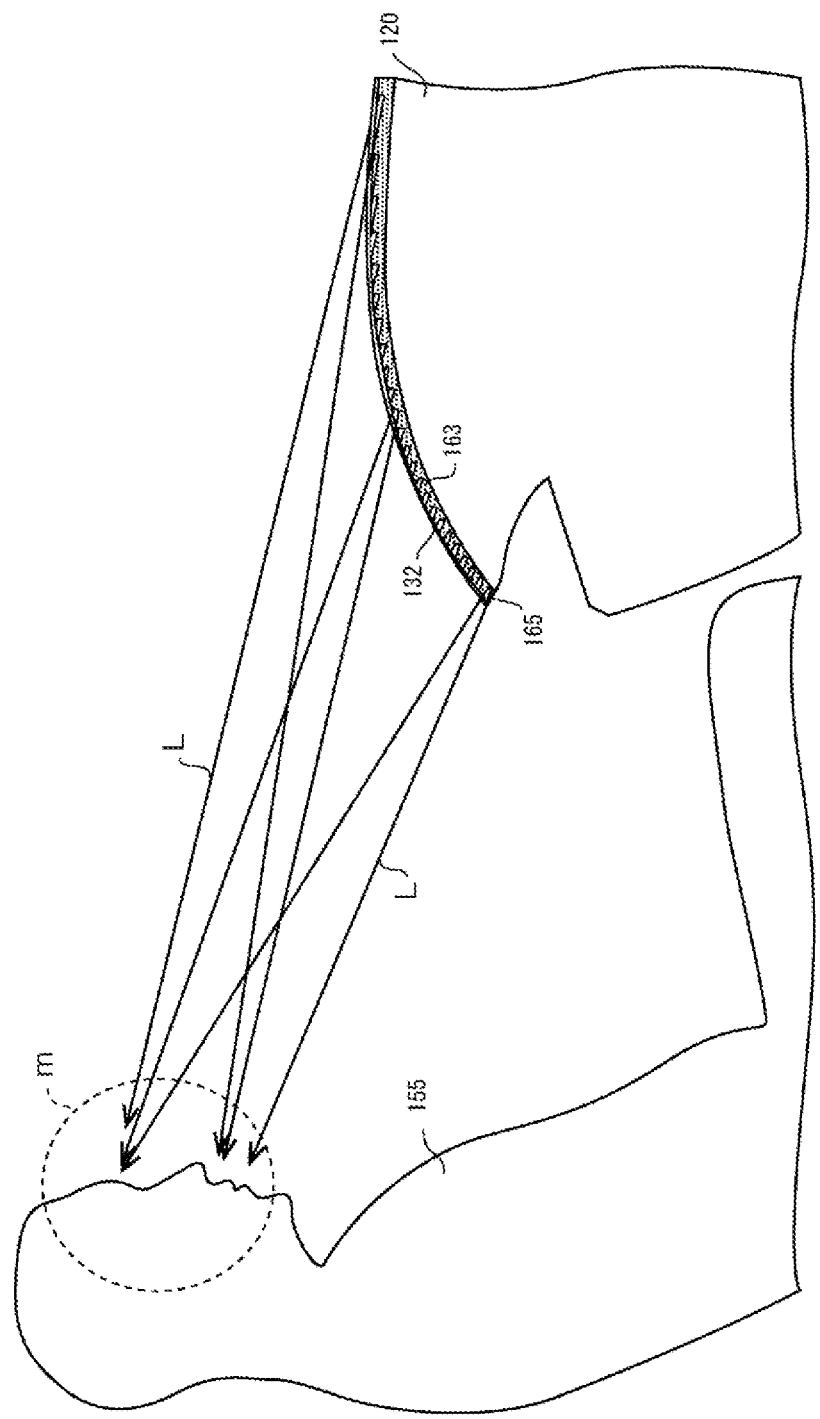
FIG. 13 illustrates a traveling direction of light L that is projected from each of LED light sources 165 arranged in a mount base 163 through a surface panel 170.

FIG. 13 illustrates a traveling direction of light L that is projected from each of the LED light sources 165 arranged in the mount base 163 through the surface panel 170. As described above, the inclination angle of the small aperture 171 formed through the surface panel 170 increases gradually as the position goes from the front passenger seat side to the front end of the windshield 110. Thus, light beams L emitted from all of the LED light sources 165 arranged in the LED circuit body 160 travel toward the face (refer to a broken-line frame in) of a driver 155 who is sitting in the front passenger seat. The driver 155 can therefore get light beams coming from all of the LED light sources 165 without the need for changing the direction of his or her line of sight.

Since the LED light sources 165 are arranged in the mount base 163 in rows continuously from the front passenger seat side to the front end of the windshield 110, the display unit 132 can produce a display having a sense of depth when lit. When the display unit 132 is not lit, since the LED circuit body 160, disposed inside the surface panel 170, of the display unit 132 is hidden behind the small aperture 171 of the surface panel 170 and external light is hard to reach the inside of the surface panel 170, which means that the inside of the surface panel 170 is darker than its neighborhood. Thus, the front passenger does not likely become aware of the presence of the LED circuit body 160.

Figure 14:
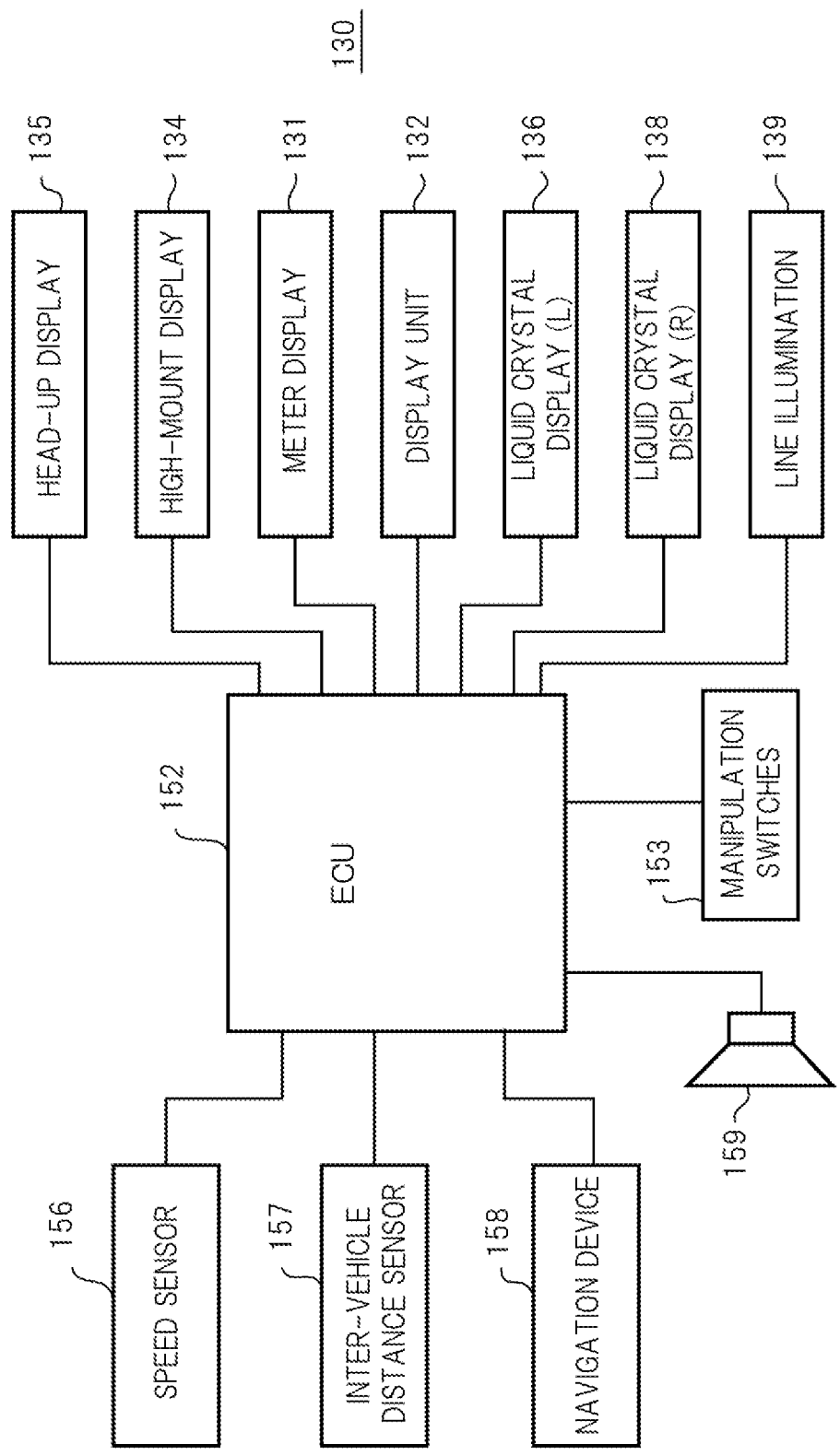
FIG. 14 is a diagram showing a hardware configuration having, as a core component, a control device 152 which controls various display devices 130 arranged on the instrument panel 120.

FIG. 14 is a diagram showing a hardware configuration having, as a core component, a control device 152 which controls the various display devices 130 arranged on the instrument panel 120. The control device 152 is an ECU (electronic control unit). In addition to the above-described various display devices 130, a speed sensor 156, an inter-vehicle distance sensor 157, a navigation device 158, a speaker 159, manipulation switches 153, etc, are connected to the control device 152.

The speed sensor 156 detects a speed of the vehicle. The inter-vehicle distance sensor 157 measures a distance to a target by sending and receiving infrared light and detects approach of the target to the self vehicle. The inter-vehicle distance sensor 157 may be configured so as to detect approach of a target to the self vehicle by analyzing an image taken by a camera. Plural inter-vehicle distance sensors 157 may be provided so as to be able to detect not only approach of a target from the front side or rear side of the vehicle but also approach of a target from the left side or the right side.

Incorporating a GPS (global positioning system) device and map data, the navigation device 158 has a function of guiding the self vehicle to a destination. In the embodiment, a navigation picture is displayed on the liquid crystal display 136. The speaker 159 emits sound information such as driving-related information, an alarm, music, etc. on the basis of audio data that is output from the control device 152, The manipulation switches 153 are used by the driver in making various switch inputs to, for example, select a piece of entertainment information.

Next, a description will be made of display operations performed by the control device 152. FIGS. 15 and 16 show display examples realized through cooperation between plural display devices. FIG. 15A shows a display example that is made at the occurrence of an excessive speed. If a vehicle speed detected by the speed sensor 156 is higher than a limit speed or the like, the control device 152 causes the display unit 132 in red. In link with this display operation, the control device 152 causes the head-up display 135 to project a blinking image of a vehicle speed in the region 135*a* of the windshield 110.

By causing the two display devices, that is, the display unit 132 and the head-up display 135, to perform display in the above-described manner, the driver can easily recognize an excessive speed and would be motivated to do safety driving.

Furthermore, an operation may be made that a display made by the display unit 132 is increased in luminance or changed in emission color or the blinking cycle of a speed-indicating image projected onto the windshield 110 is shortened, to increase the degree of excessive speed alarming given to the driver.

FIG. 15B shows a display example as an alarm indicating approach of another vehicle. If the distance to the self vehicle detected by the inter-vehicle distance sensor 157 has become shorter than a prescribed distance and hence the risk of a collision has become high, the control device 152 causes the display unit 132 to move an arrow mark a indicating a vehicle approaching direction from the windshield 110 side to the front edge of the instrument panel 120. That is, a display having a sense of perspective is made that would cause the driver to feel as if the arrow mark a were approaching from a far point to his or her side. In addition to causing the movement of the arrow mark a, the control device 152 causes the head-up display 135 to project a message indicating an approach distance (in this example, 2 m) in the region 135*a* of the windshield 110 and lights the line illuminator 139 so that it makes a flow display.

By causing the three display devices to perform display in cooperation in the above-described manner, the driver can immediately realize that the vehicle is in a dangerous situation and can be urged to take an action for avoiding the danger.

Figures 16A, 16B:
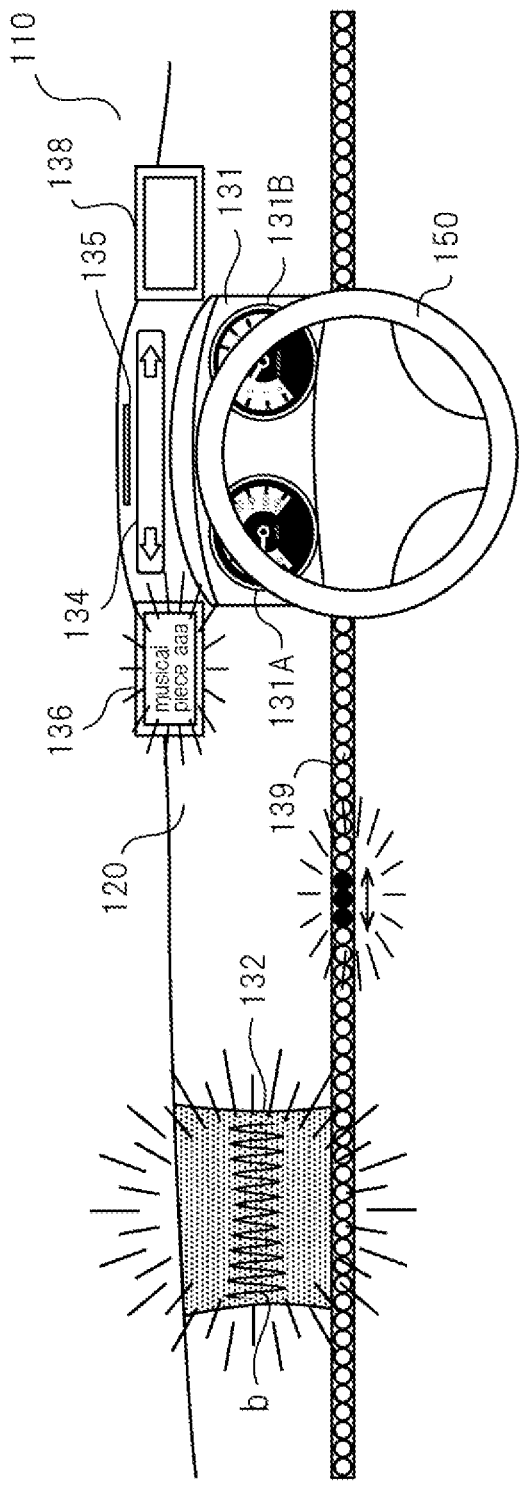
FIG. 16A shows a display example with sound reproduction.
FIG. 16B shows a display example with guidance by a navigation device 158.

FIG. 16A shows a display example with sound reproduction. If the driver selects, for example, a musical piece aaa by manipulating the manipulation switches 153 using entertainment information displayed on the liquid crystal display 136, the control device 152 causes the speaker 159 to output the musical piece aaa, causes the display unit 132 to display a waveform b in such a manner that it varies according to the rhythm and tempo of the music, and causes the line illuminator 139 to move its lighting position in such a manner that it flows according to the rhythm and tempo of the music.

Since the display of the display unit 132 is varied according to the music that is output from the speaker 159, an atmosphere for allowing the driver to enjoy the music while feeling integrity with the vehicle is produced in the vehicle compartment and the front passenger can enjoy the music more.

FIG. 16B shows a display example with guidance by the navigation device 158. A navigation picture in which a self vehicle mark is superimposed on map information is displayed on the liquid crystal display 136. If the control device 152 receives a signal commanding, for example, a right turn from the navigation device 158, the control device 152 controls the lighting of the display unit 132 and causes it to display a right turn mark c that is formed by turning on plural LED light sources 165. With this display, the driver can drive according to the navigation instruction without missing the right turn mark c.

Furthermore, irrespective of cooperating with the liquid crystal display 136 or the line illuminator 139, the display unit 132 can display various content items such as characters, a picture, a symbol, or the like by means of a combination of plural lit LED light sources 165, that is, point light sources. For example, the display unit 132 may display a smile mark while the vehicle is running in good form or a rhythmical musical piece is being reproduced. Conversely, the display unit 132 may display a crying face mark or an annoyed face mark while the vehicle is running in low fuel efficiency. As other display examples, the display unit 132 may display a speed, weather information, a traffic sign such as a stop sign, a line corresponding to an inter-vehicle distance, and a message such as a starting message.

As described above, the display unit 132 according to the fourth embodiment is incorporated in a front-passenger-seat-side body surface of the instrument panel 120. The display unit 132 is equipped with the mount base 163 on which the plural LED light sources 165 are arranged parallel with the body surface of the instrument panel 120 and the surface panel 170 which is disposed so as to cover the display surface of the mount base 163 and guides light beams emitted from the LED light sources 165 to the front passenger seat side in the vehicle compartment. The inner walls of the holes 166 which are formed in the mount base 163 also guide light beams emitted from the LED light sources 165 to the front passenger seat side in the vehicle compartment. As such, the display unit 132 which is incorporated in the instrument panel 120 which partly defines the vehicle compartment can display various kinds of information to the front passenger without causing image projection onto the windshield 110.

The display unit 132 which is incorporated in the surface of the instrument panel 120 gives the front passenger driving-related information, danger information, entertainment information, etc. while varying the display in various manners in cooperation with other display devices such as the liquid crystal display 136 and the line illuminator 139. In this manner, each display device can perform display that is suitable for its role.

As described above, since various kinds of information are displayed on the display unit which is incorporated in the instrument panel which partly defines the vehicle compartment, the driver and the front passenger can feel integrity between displayed driving-related information and the vehicle. As a result, the efficiency of information transmission to the driver and the front passenger would be increased. Thus, the driver would be more interested in the display and increased contribution to a safety drive is expected.

Furthermore, since the display unit is incorporated in a front-passenger-seat-side portion of the instrument panel, information that does not relate to driving directly, such as entertainment information, can be displayed on the display unit. This makes it possible to display information that is necessary for driving directly and information that is not in such a manner that they are discriminated from each other.

Embodiment 5

Whereas the above embodiment is directed to the case that the display unit performs display in cooperation with other display devices, the display unit may perform display alone.

Whereas in the fourth embodiment the display unit is incorporated in a front-passenger-seat-side portion of the instrument panel, a fifth embodiment is directed to a case that a display unit is incorporated in a driver-seat-side portion of the instrument panel.

Figure 17:
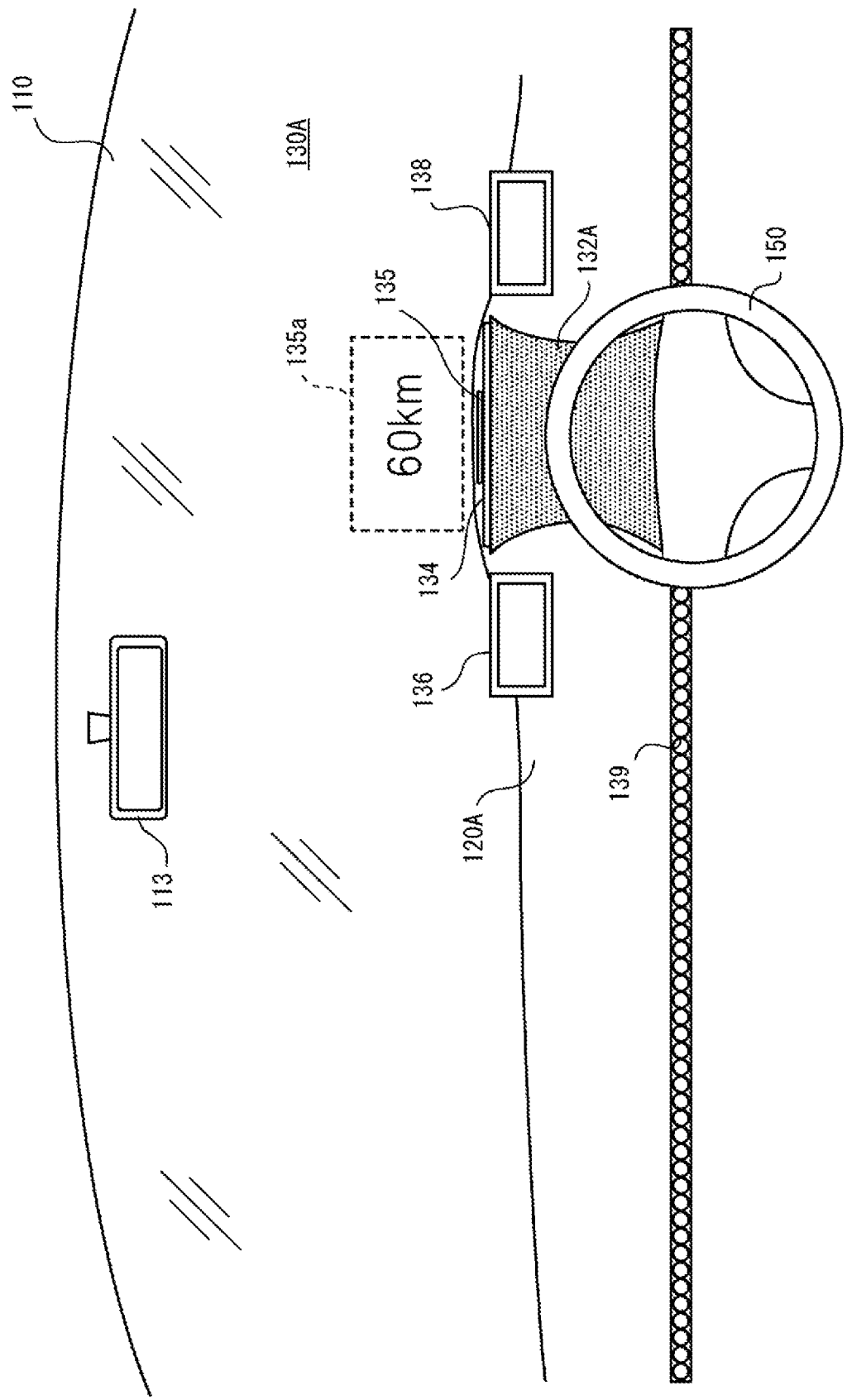
FIG. 17 is a front view showing an appearance of an instrument panel 120A incorporating a display unit 132A which is an on-vehicle display device according to a fifth embodiment and its neighborhood.

FIG. 17 is a front view showing an appearance of an instrument panel 120A incorporating a display unit 132A which is an on-vehicle display device according to the fifth embodiment and its neighborhood.

A windshield 110, a front mirror 113, the instrument panel 120A, various display devices 130A, a steering wheel 150, etc. are disposed in a part, viewable from the driver seat side, of the vehicle compartment.

Among the display devices 130A, the display unit 132A is disposed at a front-center position, closest to the steering wheel 150 and easy to see to the driver, of the instrument panel 120A so as to be incorporated in and integrated with the instrument panel 120A. Since the display unit 132A has the same structure as the display unit 132 according to the fourth embodiment, a description therefor will be omitted.

In the fifth embodiment, no particular display device is provided in a front-passenger-seat-side part of the instrument panel 120A. Where the display unit 132A extends to a position that is very close to the front end of the windshield 110, the high-mount display 134 and the head-up display 135 may be omitted.

Figure 18:
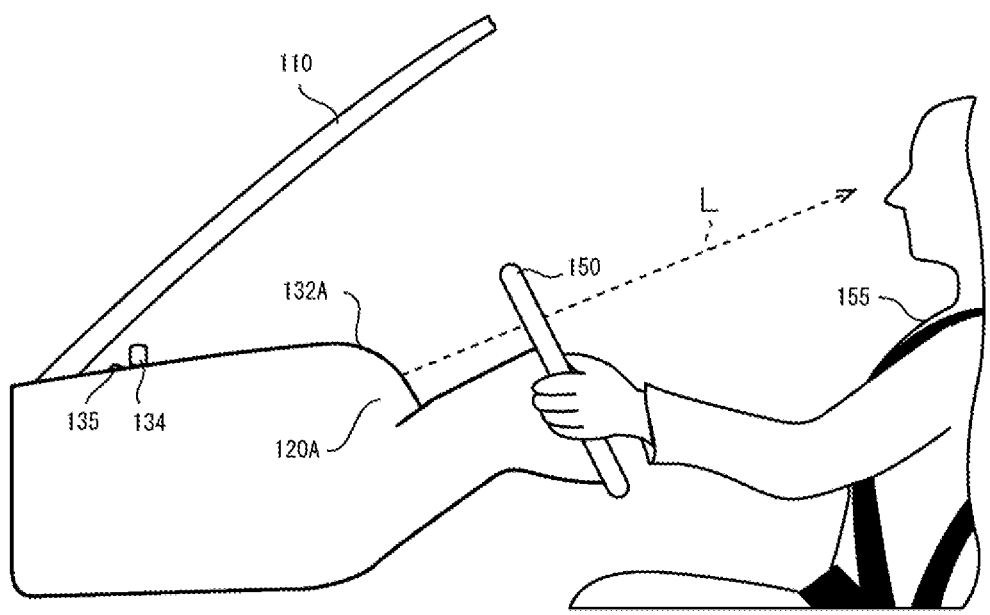
FIG. 18 is a view of an instrument panel 120A and its neighborhood as viewed in such a manner that a driver-seat-side part of the vehicle compartment is viewed from the side.

FIG. 18 is a view of the instrument panel 120A and its neighborhood as viewed in such a manner that a driver-seat-side part of the vehicle compartment is viewed from the side. Since light L emitted from the display unit 132A travels toward the face of the driver, the driver can recognize the content of a display of the display unit 132A without the need for changing the direction of his or her face.

Since the other display devices and the control device 152 are the same in configuration as those of the fourth embodiment, constituent elements having the same ones in the fourth embodiment will be given the same symbols as the latter and descriptions therefor will be omitted.

FIG. 19 shows display examples of cases that plural display devices operate in cooperation. FIG. 19A shows a display example of a case that music is listened to using entertainment information. The control device 152 causes the line illuminator 139 and the display unit 132A to perform display in cooperation according to the rhythm and tempo of music. For example, the control device 152 causes the line illuminator 139 to move its lighting positions left to right as indicated by arrow e in the figure. On the other hand, the control device 152 causes the display unit 132A to vary its lighting in a wave-like manner as indicated by arrow f in the figure. Furthermore, the control device 152 causes the line illuminator 139 to move its lighting positions rightward also on the right of the display unit 132A.

Since the lighting position or positions move as if they were dancing not only in the line illuminator 139 but also in the display unit 132A disposed right in front of the driver, he or she can listen to the music while feeling integrity with the vehicle. Thus, the driver would be more likely satisfied with enjoying the music.

FIG. 19B shows a display example that is made at the occurrence of an excessive speed. At the occurrence of an excessive speed, the control device 152 causes the display unit 132A to display marks h indicating that the vehicle is going forward and to move them upward. Furthermore, the control device 152 causes the display unit 132A to display the marks h indicating that the vehicle is going forward so that they move forward faster as the speed received from the speed sensor 156 increases. With the above display having a sense of perspective, the driver can more easily become aware of an excessive speed that is increasing.

As described above, also with the display unit 132A which is incorporated in a driver-seat-side part of the surface of the instrument panel 120A, it is possible to notify the driver of driving-related information, danger information, entertainment information, etc. by causing it to vary its display in various manners in cooperation with other display devices such as the liquid crystal display 136 and the line illuminator 139.

It is possible to convey ordinary driving-related information to the driver by causing the display unit 132A which is incorporated in a driver-seat-side part of the instrument panel 120A to display that information. For example, such information as blinkers, turning on/off of the headlights, and turning on/off of the air conditioner may be displayed on the display unit 132A.

This would cause the driver to feel integrity between displayed driving-related information and the vehicle more strongly and, as a result, would increase the efficiency of information transmission to the driver.

The technical scope of the invention is not limited to the above embodiments. Various modifications, improvements, etc. can be made of the above embodiments within the technical scope of the invention.

For example, although in the above embodiments the display unit that is incorporated in the instrument panel is formed in such a manner that the plural LED light sources are arranged in the curved mount base extending from a front portion of the instrument panel to a position close to the front end of the windshield and the top surface of the mount base is covered with the surface panel, the display unit may be formed in the following manner. That is, the display unit may be formed in such a manner that LEDs are mounted in advance on a curved printed circuit board (PCB) extending from a front portion of the instrument panel to a position close to the front end of the windshield and the top surface of the printed circuit board is covered with the surface panel.

Although in the above embodiments the display unit employs the LED light sources, the display unit may be such as to employ a device that displays an image throughout its surface, such as an organic EL panel. Furthermore, organic EL elements functioning as point light sources may be employed.

Although in the above embodiments the display unit is incorporated only in one of a driver-seat-side portion or a front-passenger-seat-side portion of the instrument panel, it may be installed in both of a driver-seat-side portion or a front-passenger-seat-side portion.

Embodiment 6

An on-vehicle display device according to a sixth embodiment will be hereinafter described with reference to the drawings. The on-vehicle display device according to this embodiment is employed as a display unit that is incorporated in the surface of the instrument panel as part of it.

Figure 20:
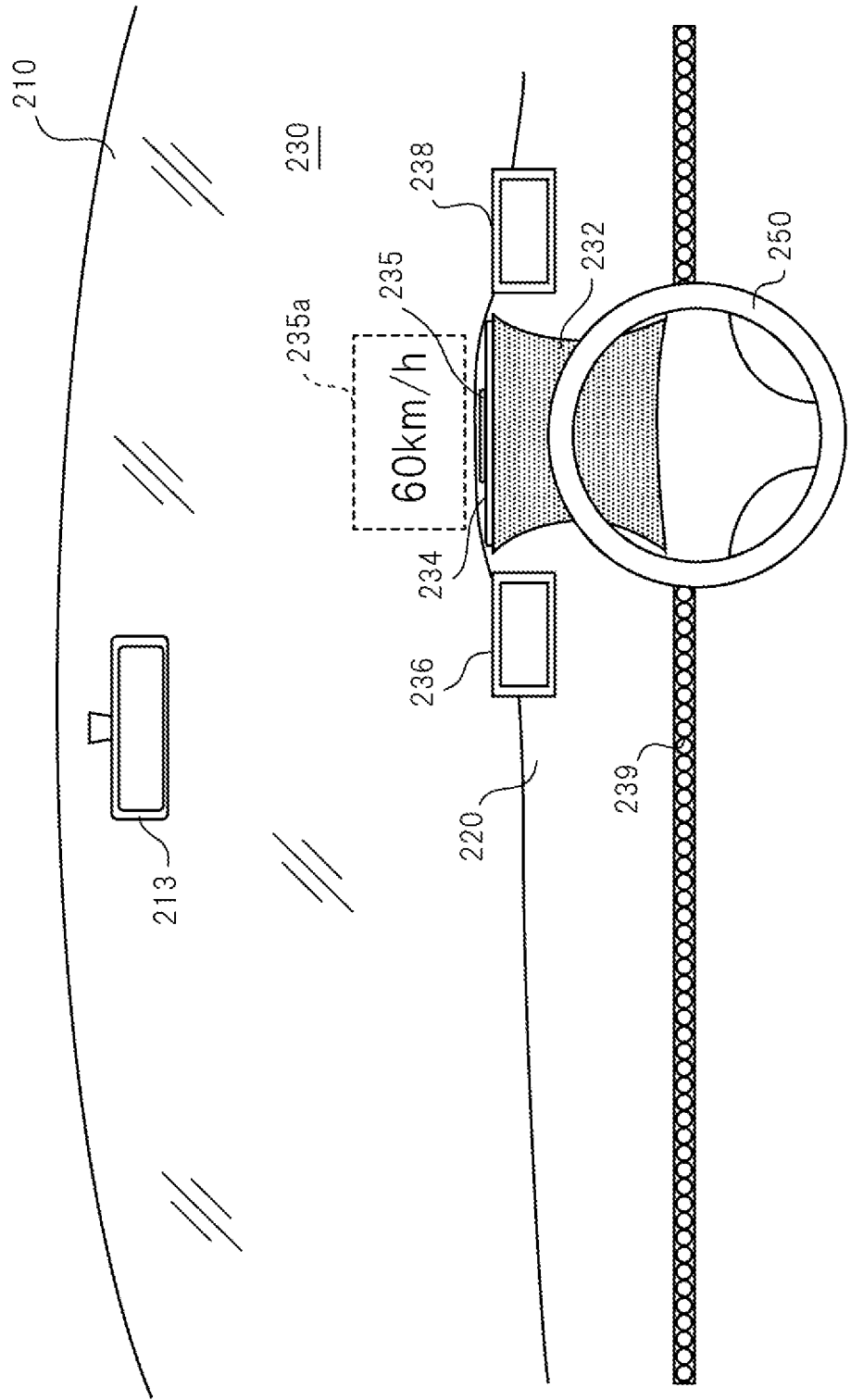
FIG. 20 is a front view showing an appearance of an instrument panel 220 incorporating a display unit 232 which is an on-vehicle display device according to a sixth embodiment and its neighborhood.

FIG. 20 is a front view showing an appearance of an instrument panel 220 incorporating a display unit 232 which is the on-vehicle display device according to the sixth embodiment and its neighborhood.

A windshield 210, a front mirror 213, the instrument panel 220, various display devices 230, a steering wheel 250, etc. are disposed in a part, viewable from the driver seat side, of the vehicle compartment.

Among the display devices 230, the display unit 232 is disposed at a front-center position, closest to the steering wheel 220 and easy to see to the driver, of the instrument panel 220 so as to be incorporated in and integrated with the instrument panel 220.

A pair of liquid crystal displays 236 and 238 are disposed on the two respective sides of the display unit 232. The liquid crystal displays 236 and 238 display various kinds of information such as driving-related information, danger announcement information, navigation information, and entertainment information.

A high-mount display 234 is disposed on the top surface of the instrument panel 220. The high-mount display 234 displays, for example, blinker images.

A head-up display 235 for projection onto the windshield 210 is disposed on the top surface of the instrument panel 220 near the windshield 210. The head-up display 235 displays speed information etc. in a region 235a, easy to recognize visually to the driver, on the windshield 210. In FIG. 20, a speed "60 km/h" is projected.

A line illuminator 239 is disposed below the display unit 232 of the instrument panel 220 so as to extend in the left-right direction. The line illuminator 239, in which plural LED light sources are arranged in the left-right direction, lights up so as to produce, for example, a flow in the left-right direction and thereby gives the driver an impression of novelty.

The display unit 232 is a display device that extends parallel with the surface of the instrument panel 220 without any gaps from a driver-seat-side front portion of the instrument panel 220 to a position close to the front end of the windshield 210 and is incorporated in the instrument panel 220 so as to form approximately the same surface as the body surface of the instrument panel 220.

Figure 21:
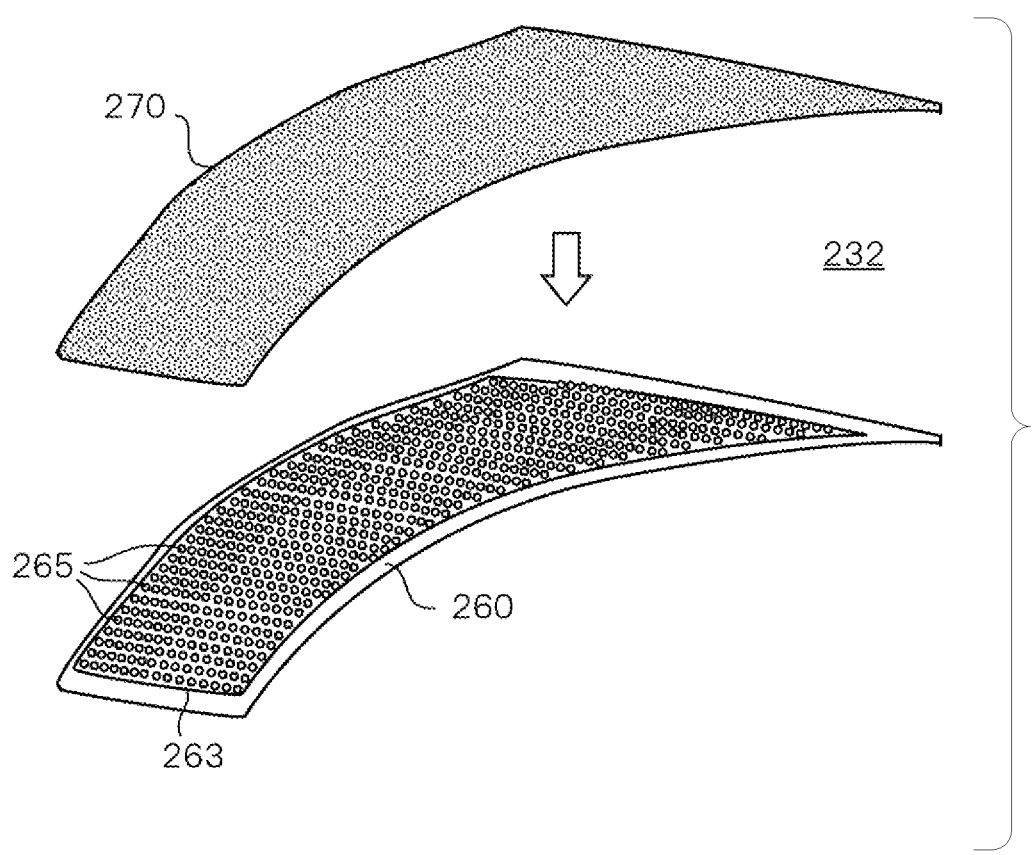
FIG. 21 is a perspective view showing the structure of the display unit 232.

FIG. 21 is a perspective view showing the structure of the display unit 232. The display unit 232 is a display device that extends from a front portion of the instrument panel 220 to a position close to the front end of the windshield 210 and thus produces a display having a sense of depth. And the display unit 232 has a structure that a surface panel 270 is laid on an LED circuit body 260.

In the LED circuit body 260, plural lines of LED light sources (point light sources) 65 are arranged on a mount base 263 like stairs. The LED circuit body 260 is formed so as to conform to the curved surface of the instrument panel 220. On the other hand, the surface panel 270 has such a curved shape as to be laid on the LED circuit body 260. The surface panel 270 and the instrument panel 220 form an integral surface. That is, the surface panel 270 is visually recognized by the driver like part of the instrument panel 220. As described later, plural small apertures 271 (see FIG. 22) are formed through the surface panel 270 for the LED light sources.

Figure 22:
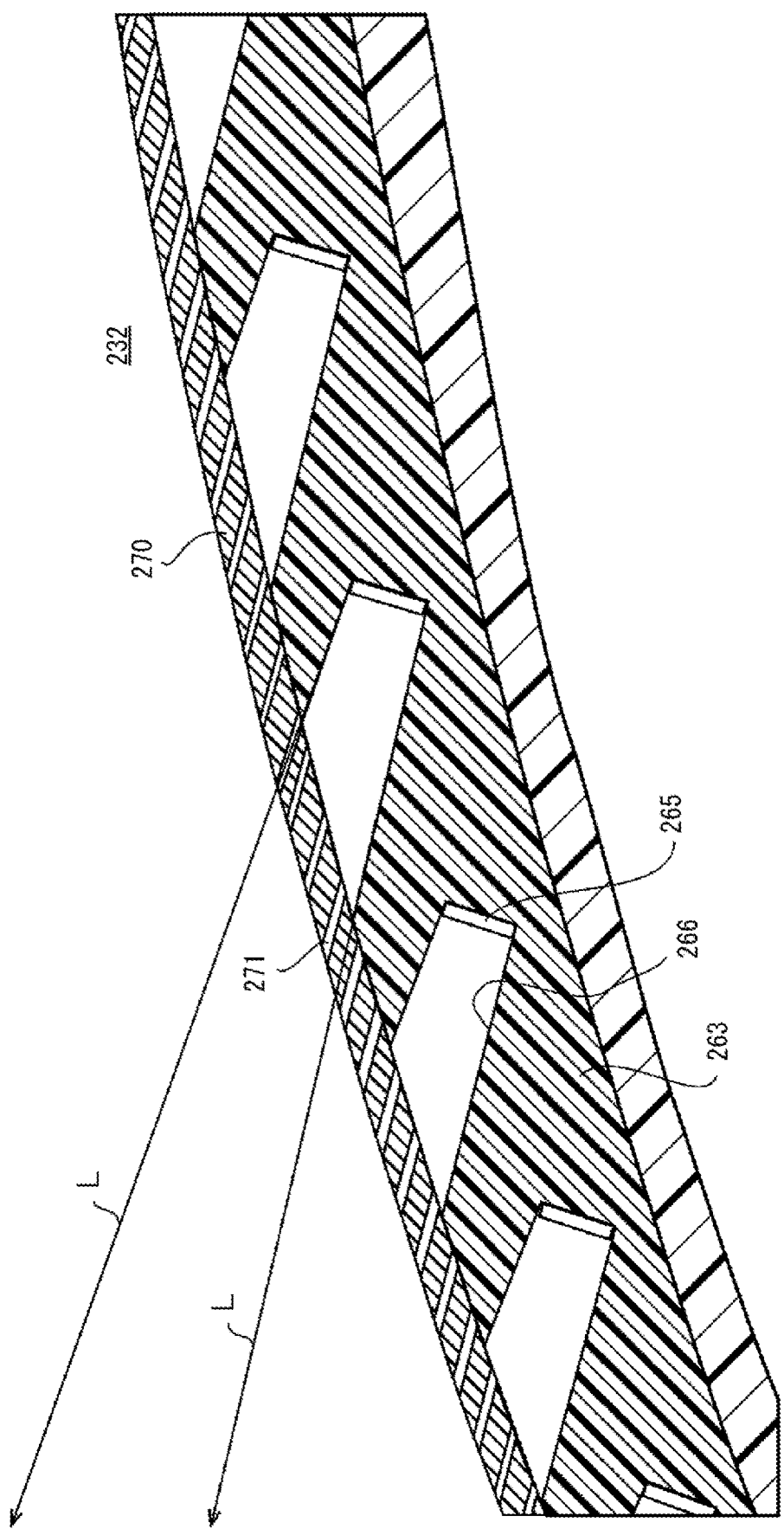
FIG. 22 is an enlarged sectional view of part of the display unit 232 and shows its structure.

FIG. 22 is an enlarged sectional view of part of the display unit 232. The surface of the mount base 263 is formed with a large number of holes 266 (stairs) which are open to the driver seat side. The LED light sources 265 are disposed on the bottom surfaces of the holes 266, respectively.

The plural small apertures 271 are formed through the surface panel 270 in such a manner that light beams L emitted from the LED light sources 265 and exit the plural holes 266, respectively, travel toward the front passenger seat side. The number of small apertures 271 per LED light source 265 is about six to nine. The small apertures 271 have prescribed angles with respect to the thickness direction of the surface panel 270. The inclination angle of the small aperture 271 decreases as the position comes closer to the driver seat, that is, increases as the position comes closer to the windshield 210. In a region where the surface of the surface panel 270 is perpendicular to the direction to the driver seat side, the inclination angles of the small aperture 271 may be set at approximately equal to 0°.

The holes 266 are also inclined with respect to the thickness direction of the mount base 263, and their inclination angle, like the inclination angle of the small apertures 271, decreases as the position comes closer to the driver seat, that is, increases as the position comes closer to the windshield 210. An inner wall of each hole 266 also serves as a visor member for preventing light L emitted from the associated LED light source 265 from going toward the windshield 210.

As described above, the inner walls of the holes 266 and the small apertures 271 of the surface panel 270 have a light guiding function of guiding light beams emitted from the LED light sources 265 disposed in the mount base 263 to the driver seat side in the vehicle compartment. The light guiding function may be realized only by the inner walls of the holes 266 or the small apertures 271 of the surface panel 270.

Figure 23:
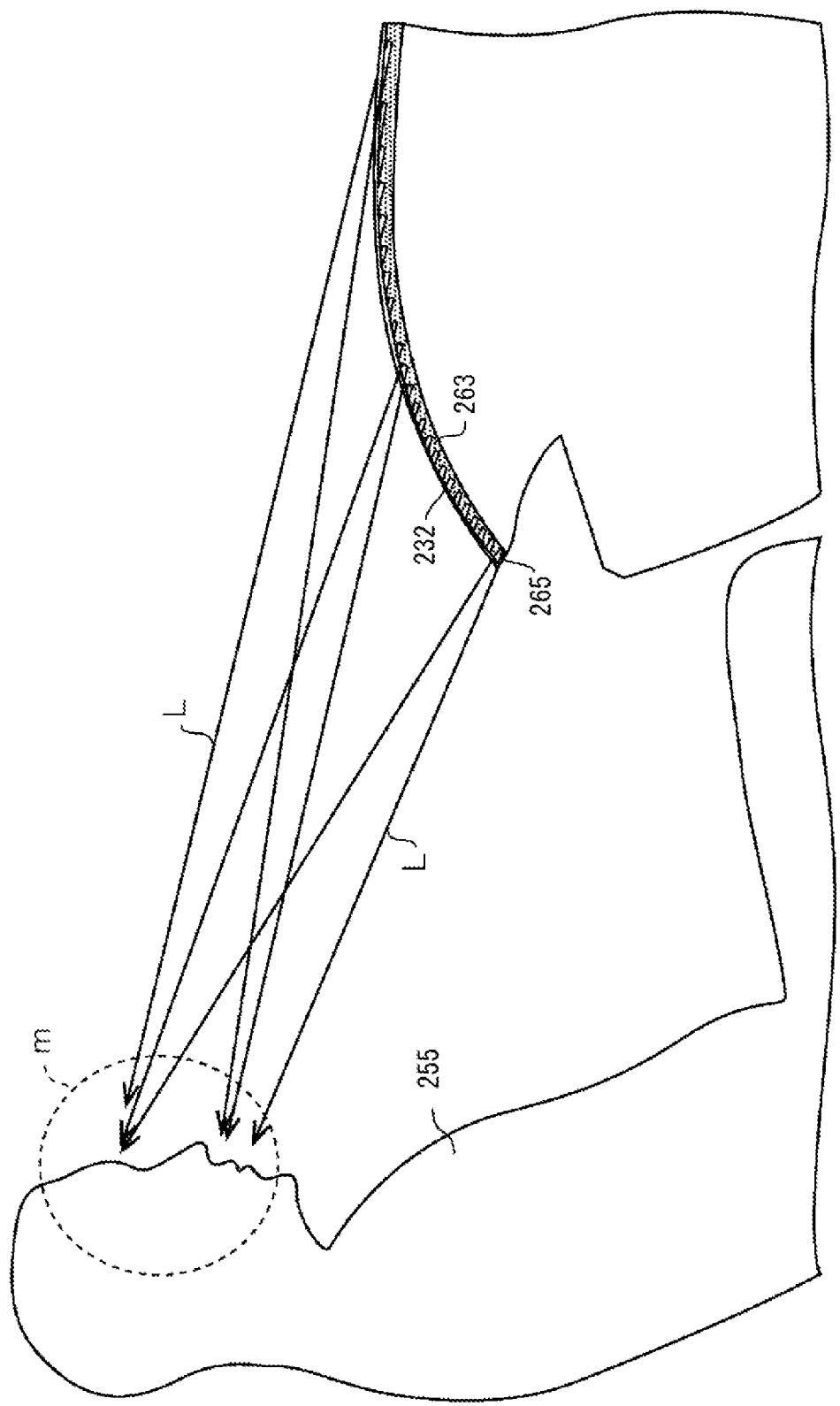
FIG. 23 illustrates a traveling direction of light L that is projected from each of LED light sources 265 arranged in a mount base 263 through a surface panel 270.

FIG. 23 illustrates a traveling direction of light L that is projected from each of the LED light sources 265 arranged in the mount base 263 through the surface panel 270. As described above, the inclination angle of the small aperture 271 formed through the surface panel 270 increases gradually as the position goes from the driver seat side to the front end of the windshield 210. Thus, light beams L emitted from all of the LED light sources 265 arranged in the LED circuit body 260 travel toward the face (refer to a broken-line frame m) of a driver 255 who is sitting in a passenger seat such as the driver seat. The driver 255 can therefore get light beams coming from all of the LED light sources 265 without the need for changing the direction of his or her line of sight.

Since the LED light sources 265 are arranged in the mount base 263 in rows continuously from the driver seat side to the front end of the windshield 210, the display unit 232 can produce a display having a sense of depth when lit. When the display unit 232 is not lit, since the LED circuit body 260, disposed inside the surface panel 270, of the display unit 232 is hidden behind the small aperture 271 of the surface panel 270 and external light is hard to reach the inside of the surface panel 270, which means that the inside of the surface panel 270 is darker than its neighborhood. Thus, the driver does not likely become aware of the presence of the LED circuit body 260.

Figure 24:
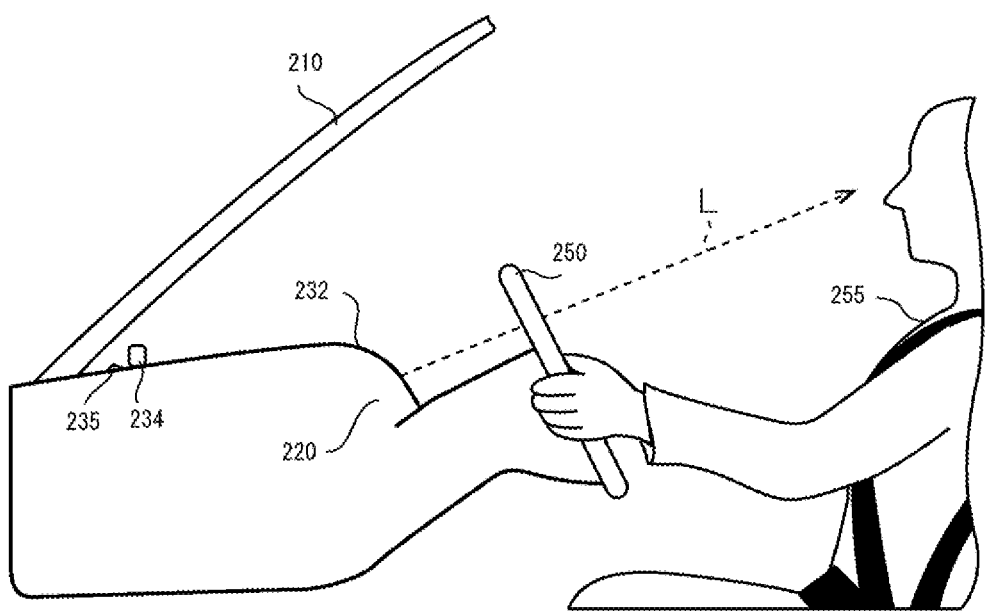
FIG. 24 is a view of the instrument panel 220 and its neighborhood as viewed in such a manner that a driver-seat-side part of the vehicle compartment is viewed from the side.

FIG. 24 is a view of the instrument panel 220 and its neighborhood as viewed in such a manner that a driver-seat-side part of the vehicle compartment is viewed from the side. Since light L emitted from the display unit 232 travels toward the face of the driver, the driver can recognize the content of a display of the display unit 232 without the need for changing the direction of his or her face.

Figure 25:
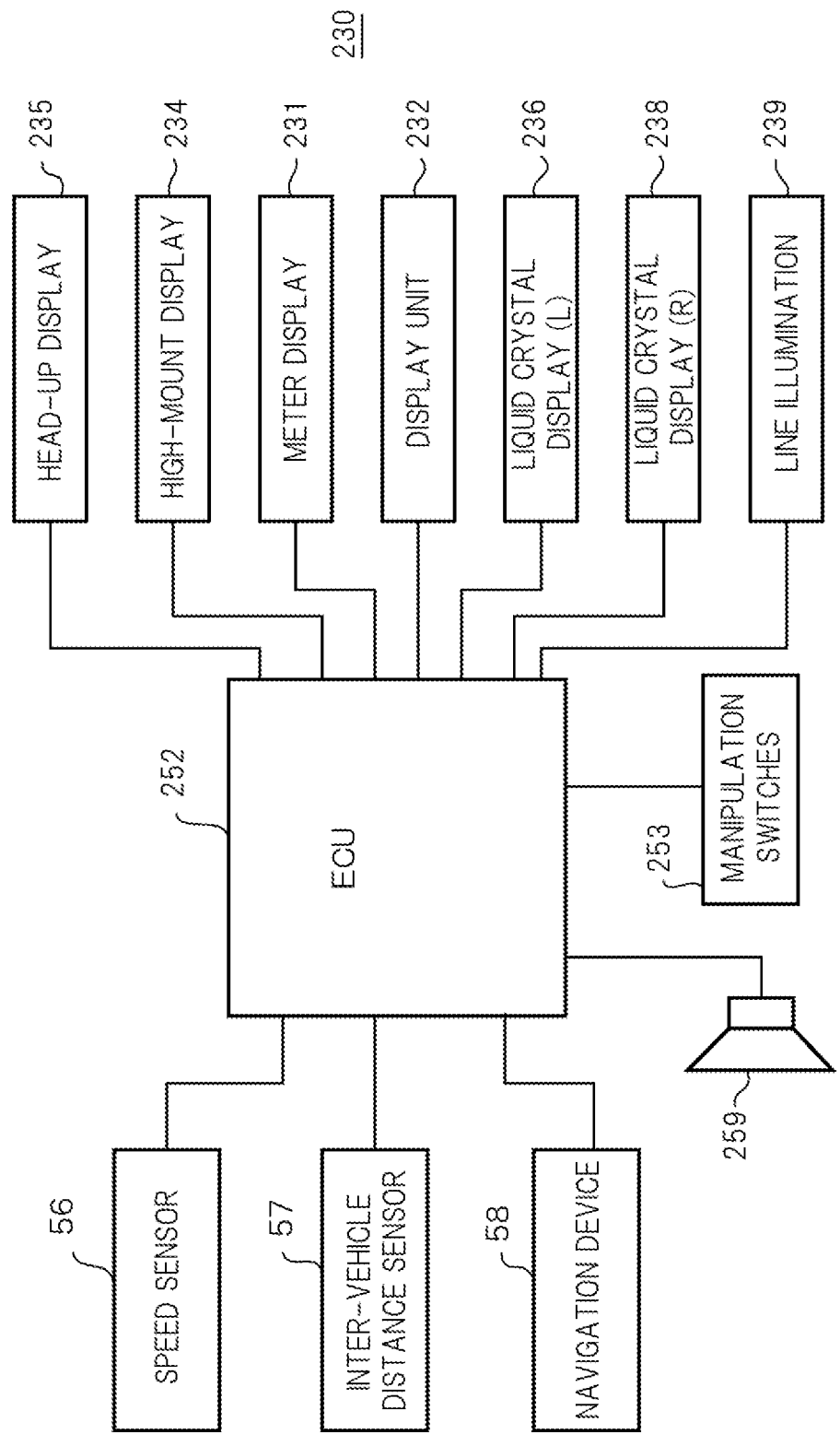
FIG. 25 is a diagram showing a hardware configuration having, as a core component, a control device 252 which controls various display devices 230 arranged on the instrument panel 220.

FIG. 25 is a diagram showing a hardware configuration having, as a core component, a control device 252 which controls the various display devices 230 arranged on the instrument panel 220. The control device 252 is an ECU (electronic control unit). In addition to the above-described various display devices 230, a speed sensor 256, an inter-vehicle distance sensor 257, a navigation device 258, a speaker 259, manipulation switches 253, etc. are connected to the control device 252.

The speed sensor 256 detects a speed of the vehicle. The inter-vehicle distance sensor 257 measures a distance to a target by sending and receiving infrared light and detects approach of the target to the self vehicle. The inter-vehicle distance sensor 257 may be configured so as to detect approach of a target to the self vehicle by analyzing an image taken by a camera. Plural inter-vehicle distance sensors 257 may be provided so as to be able to detect not only approach of a target from the front side or rear side of the vehicle but also approach of a target from the left side or the right side.

Incorporating a GPS (global positioning system) device and map data, the navigation device 258 has a function of guiding the self vehicle to a destination. In the embodiment, a navigation picture is displayed on the liquid crystal display 236. The speaker 259 emits sound information such as driving-related information, an alarm, music, etc. on the basis of audio data that is output from the control device 252. The manipulation switches 253 are used by the driver in making various switch inputs to, for example, select a piece of entertainment information.

FIG. 26 shows display examples of cases that plural display devices operate in cooperation. FIG. 26A shows a display example of a case that music is listened to using entertainment information. The control device 252 causes the line illuminator 239 and the display unit 232 to perform display in cooperation according to the rhythm and tempo of music. For example, the control device 252 causes the line illuminator 239 to move its lighting positions left to right as indicated by arrow e in the figure. On the other hand, the control device 252 causes the display unit 232 to vary its lighting in a wave-like manner as indicated by arrow f in the figure. Furthermore, the display unit 232 causes the line illuminator 239 to move its lighting positions rightward also on the right of the display unit 232.

Since the lighting position or positions move as if they were dancing not only in the line illuminator 239 but also in the display unit 232 disposed right in front of the driver, he or she can listen to the music while feeling integrity with the vehicle. Thus, the driver would be more likely satisfied with enjoying the music.

FIG. 26B shows a display example that is made at the occurrence of an excessive speed. At the occurrence of an excessive speed, the control device 252 causes the display unit 232 to display marks h indicating that the vehicle is going forward and to move them upward. Furthermore, the control device 252 causes the display unit 232 to display the marks h indicating that the vehicle is going forward so that they move forward faster as the speed received from the speed sensor 256 increases. With the above display having a sense of perspective, the driver can more easily become aware of an excessive speed that is increasing.

As described above, with the display unit 132A which is incorporated in a driver-seat-side part of the surface of the instrument panel 220, it is possible to notify the driver of driving-related information, danger information, entertainment information, etc. by causing it to vary its display in various manners in cooperation with other display devices such as the liquid crystal display 236 and the line illuminator 239.

It is possible to convey ordinary driving-related information to the driver by causing the display unit 232 which is incorporated in a driver-seat-side part of the instrument panel 220 to display that information. For example, such information as blinkers, turning on/off of the headlights, and turning on/off of the air conditioner may be displayed on the display unit 232.

This would cause the driver to feel integrity between displayed driving-related information and the vehicle more strongly and, as a result, would increase the efficiency of information transmission to the driver.

Furthermore, irrespective of cooperating with the liquid crystal display 236 or the line illuminator 239, the display unit 232 can display various content items such as characters, a picture, a symbol, or the like by means of a combination of plural lit LED light sources 165, that is, point light sources. For example, the display unit 232 may display a smile mark while the vehicle is running in good form or a rhythmical musical piece is being reproduced. Conversely, the display unit 232 may display a crying face mark or an annoyed face mark while the vehicle is running in low fuel efficiency. As other display examples, the display unit 232 may display a speed, weather information, a traffic sign such as a stop sign, a line corresponding to an inter-vehicle distance, and a message such as a starting message.

The technical scope of the invention is not limited to the above embodiment. Various modifications, improvements, etc. can be made of the above embodiment within the technical scope of the invention.

For example, although in the above embodiment the display unit that is incorporated in the instrument panel is formed in such a manner that the plural LED light sources are arranged in the curved mount base extending from a front portion of the instrument panel to a position close to the front end of the windshield and the top surface of the mount base is covered with the surface panel, the display unit may be formed in the following manner. That is, the display unit may be formed in such a manner that LEDs are mounted in advance on a curved printed circuit board (PCB) extending from a front portion of the instrument panel to a position close to the front end of the windshield and the top surface of the printed circuit board is covered with the surface panel.

Although in the above embodiment the display unit 232 employs the LED light sources, the display unit 232 may be such as to employ a device that displays an image throughout its surface, such as an organic EL panel. Furthermore, organic EL elements may be caused to display an image as produced by point light sources.

Furthermore, the display unit 232 may be such as to display an image using TFTs (thin-film transistors). In this case, for example, the mount base 263 of the LED circuit body 260 is formed like stairs and TFTs are provided for the respective stairs.

Instead of disposing the high-mount display 234 and the head-up display 235 on the top surface of the instrument panel 220, the display unit 232 may extend to a position that is even closer to the windshield 210.

Figure 27:
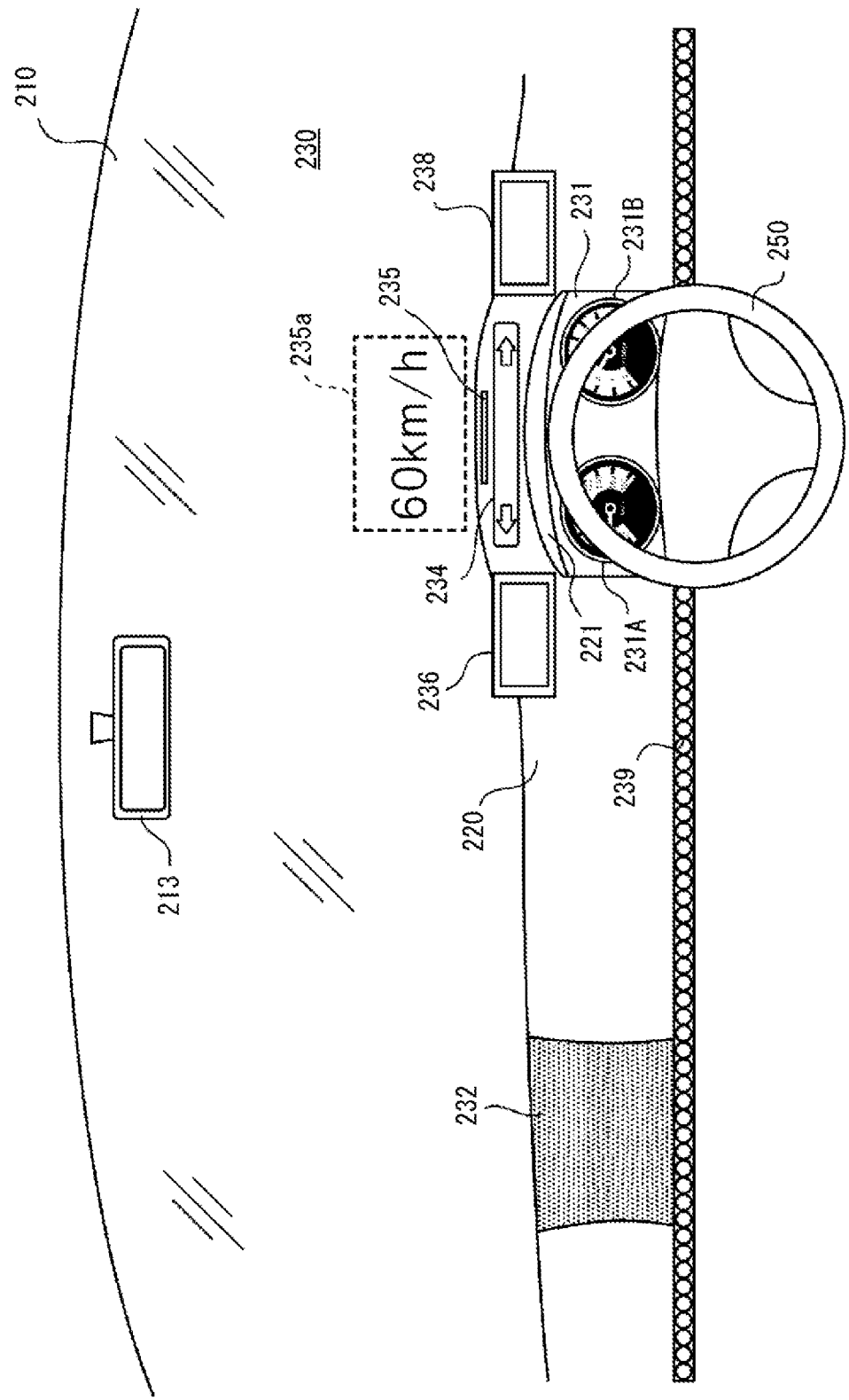
FIG. 27 is a front view showing an appearance of the instrument panel 220 incorporating, in a front-passenger-seat-side portion of it, the display unit 232 which is the on-vehicle display device according to the sixth embodiment and its neighborhood.

Although in the above embodiment the display unit 232 is incorporated only in a driver-seat-side portion of the instrument panel, it may be installed only in a front-passenger-seat-side portion. FIG. 27 is a front view showing an appearance of the instrument panel 220 and its neighborhood. The display unit 232 which is an on-vehicle display device according to this embodiment is incorporated in a front-passenger-seat-side portion of the instrument panel 220.

The windshield 210, the front mirror 213, the instrument panel 220, the various display devices 230, the steering wheel 250, etc, are disposed in a part, viewable from the driver seat side, of the vehicle compartment.

Among the various display devices 230, the meter display 231 is disposed at a front-center position, closest to the steering wheel 250 and easy to see to the driver, of the instrument panel 220. The meter display 231 displays a speedometer 231A, an engine tachometer 231B, etc. The instrument panel 220 is formed with a meter hood 221 which serves as a visor for the meter display 231.

A pair of liquid crystal displays 236 and 238 are disposed on the two respective sides of the meter display 231. The liquid crystal displays 236 and 238 display various kinds of information such as driving-related information, danger announcement information, navigation information, and entertainment information.

The display unit 232 is incorporated in a front-passenger-seat-side front surface of the instrument panel 220. The display unit 232 extends parallel with the surface of the instrument panel 220 without any gaps from a front-passenger-seat-side front portion of the instrument panel 220 to a position close to the front end of the windshield 210, and is incorporated in the instrument panel 220 so as to form approximately the same surface as the body surface of the instrument panel 220.

As described above, since various kinds of information are displayed on the display unit which is incorporated in the instrument panel which partly defines the vehicle compartment, the driver and the front passenger can feel integrity between displayed driving-related information and the vehicle. As a result, the efficiency of information transmission to the driver and the front passenger would be increased. Thus, the driver would be more interested in the display and increased contribution to a safety drive is expected.

Furthermore, since the display unit is incorporated in a front-passenger-seat-side portion of the instrument panel, information that does not relate to driving directly, such as entertainment information, can be displayed on the display unit. This makes it possible to display information that is necessary for driving directly and information that is not in such a manner that they are discriminated from each other.

The display unit may be incorporated in both of the driver seat side and the front passenger seat side.

Features of the above-described surface panels, display units, on-vehicle display devices, and instrument panels according to the embodiments of the invention will be summarized concisely below in the form of items (1) to (21):

(1) A surface panel (40) which is installed so as to cover a display surface of a display portion or portions (32) provided in an instrument panel (20) of a vehicle, wherein:
plural small apertures (41) are formed through the surface panel (40); and
axial lines of the small apertures (41) are inclined so as to be directed to the driver or passenger seat side.

(2) The surface panel (40) according to the above item (1), wherein inclination angles of the small apertures are set at such values that an image of the display unit (32) is not projected onto a full area or a prescribed region, included in a field of view of the driver or passenger, of a windshield (10).

(3) The surface panel (40) according to the above item (2), wherein an extension of a line connecting any pair of points on edges of end openings of each of the small apertures does not intersect the full area or the prescribed region of the windshield (10).

(4) The surface panel (40) according to the above item (2), wherein the inclination angles of the small apertures with respect to the thickness direction of the surface panel (40) are small on the driver or passenger seat side and large on the windshield (10) side.

(5) A display unit (31, 80, 81) comprising:
the surface panel (40) according to the above item (1); and
the display portion or portions (32).

(6) The display unit (31) according to the above item (5), wherein:
the display portion (32) is housed in a recess (22) that is formed in the instrument panel (20); and
an inner wall of the recess (22) serves as a visor.

(7) The display unit according to the above item (6), wherein:
plural recesses (hole 66) are formed in such a manner that lines of recesses are arranged like stairs from the driver or passenger seat side to the windshield side:
light sources (65) of the respective display portions (32) are arranged in rows; and
the rows of light sources (65) are provided in the respective stairs of the plural recesses (hole 66).

(8) The display unit (80, 81) according to the above item (5), wherein the display portions (32) are plural point light sources (65) that are arranged in a base (63) that is laid on a surface of the instrument panel (20) so as to conform to it.

(9) The display unit (31, 80, 81) according to the above item (5), wherein the surface panel (40) constitutes part of the instrument panel (20).

(10) An instrument panel (20) comprising the display unit (31, 80, 81) according to the above item (5).

(11) An on-vehicle display device (display unit 132, 132A) incorporated in a body surface of an instrument panel (120, 120A) of a vehicle, comprising:
a base (mount base 163) which displays an image parallel with the body surface: and
a surface panel (170) which covers a surface of the base (mount base 163) and guides the image displayed by the base (mount base 163) to a driver or passenger-seat-side part of a vehicle compartment.

(12) The on-vehicle display device (display unit 132A) according to the above item (11), wherein the on-vehicle display device is incorporated in a driver-seat-side portion of the body surface of the instrument panel (120A).

(13) The on-vehicle display device (display unit 132) according to the above item (11), wherein the on-vehicle display device is incorporated in a front-passenger-seat-side portion of the body surface of the instrument panel (120).

(14) The on-vehicle display device (display unit 132, 132A) according to the above item (11), wherein a surface of the surface panel (170) is visually recognized as part of the instrument panel (120, 120A) when no image is displayed.

(15) An instrument panel (120, 120A) comprising the on-vehicle display device (display unit 132, 132A) according to the above item (11).

(16) An on-vehicle display device (display unit 232) incorporated in a body surface of an instrument panel (220) of a vehicle, comprising:
a base (mount base 263) which displays an image parallel with the body surface; and
a surface panel (270) which covers a surface of the base (mount base 263) and guides the image displayed by the base (mount base 263) to a driver or passenger-seat-side part of a vehicle compartment, wherein the on-vehicle display device is incorporated so as to extend from a driver or passenger-seat-side portion of the instrument panel (220) to a front end of a windshield (210).

(17) The on-vehicle display device (display unit 232) according to the above item (16), wherein the base is formed like stairs on the body surface of the instrument panel (220) so as to conform to it.

(18) The on-vehicle display device (display unit 232) according to the above item (16), wherein the on-vehicle display device is incorporated in a driver-seat-side portion of the body surface of the instrument panel (220).

(19) The on-vehicle display device (display unit 232) according to the above item (16), wherein the on-vehicle display device is incorporated in a front-passenger-seat-side portion of the body surface of the instrument panel (220).

(20) The on-vehicle display device (display unit 232) according to the above items (16), wherein the on-vehicle display device is incorporated in such a manner that the body surface and a surface of the surface panel (270) constitute approximately the same surface.

(21) An instrument panel (220) comprising the on-vehicle display device (display unit 232) according to the above item (16).

Although the invention has been described in detail by referring to the particular embodiments, it is apparent to those skilled in the art that various changes and modifications are possible without departing from the spirit and scope of the invention.

The invention provides an advantage that the degree of image projection onto a windshield can be lowered to such a level that it does not affect driving without impairing design performance. Providing this advantage, the invention is useful when applied to surface panels, display units, on-vehicle display devices, and instrument panels.

What is claimed is:

1. A surface panel which is installed so as to cover a display surface of a display portion or portions provided in an instrument panel of a vehicle, wherein:
   plural small apertures are formed through the surface panel and are open to both an outside of the surface panel and an inside of the surface panel;
   wherein axial lines of the small apertures are inclined at acute angles through a thickness of the surface panel so as to be directed to the driver or passenger seat side,
   wherein at least a first one of the plural small apertures is arranged at a first one of the acute angles through the thickness of the surface panel,
   wherein at least a second one of the plural small apertures is arranged at a second one of the acute angles through the thickness of the surface panel, and
   wherein the first one of the acute angles is different than a second one of the acute angles.

2. The surface panel according to claim 1, wherein inclination angles of the small apertures are set at such values that an image of the display unit is not projected onto a full area or a prescribed region, included in a field of view of the driver or passenger, of a windshield.

3. The surface panel according to claim 2, wherein the small apertures each comprise ones of first openings, facing into the instrument panel, and second openings, facing away from the instrument panel, and
   wherein the small apertures are arranged such that lines, through edges of respective ones of the first openings and second openings do not intersect the full area or the prescribed region of the windshield.

4. The surface panel according to claim 2, wherein the inclination angles of the small apertures with respect to the thickness direction of the surface panel are small on the driver or passenger seat side and large on the windshield side.

5. A display unit comprising:
   the surface panel according to claim 1; and
   the display portion or portions.

6. The display unit according to claim 5, wherein:
   the display portion is housed in a recess that is formed in the instrument panel; and
   an inner wall of the recess serves as a visor.

7. The display unit according to claim 6, wherein:
   plural recesses are formed in such a manner that lines of recesses are arranged like stairs from the driver or passenger seat side to the windshield side;
   light sources of the respective display portions are arranged in rows; and
   the rows of light sources are provided in the respective stairs of the plural recesses.

8. The display unit according to claim 5, wherein the display portions are plural point light sources that are arranged in a base that is laid on a surface of the instrument panel so as to conform to it.

9. The display unit according to claim 5, wherein the surface panel constitutes part of the instrument panel.

10. An instrument panel comprising the display unit according to claim 5.

11. An on-vehicle display device incorporated in a body surface of an instrument panel of a vehicle, comprising:
    a base which displays an image parallel with the body surface; and
    a surface panel which covers a surface of the base and guides the image displayed by the base to a driver or passenger-seat-side part of a vehicle compartment,
    wherein the surface panel comprises plural small apertures formed through the surface panel and open to both an outside of the surface panel and an inside of the surface panel,
    wherein axial lines of the small apertures are inclined at acute angles through a thickness of the surface panel,
    wherein at least a first one of the plural small apertures is arranged at a first one of the acute angles through the thickness of the surface panel,
    wherein at least a second one of the plural small apertures is arranged at a second one of the acute angles through the thickness of the surface panel, and
    wherein the first one of the acute angles is different than a second one of the acute angles.

12. The on-vehicle display device according to claim 11, wherein the on-vehicle display device is incorporated in a driver-seat-side portion of the body surface of the instrument panel.

13. The on-vehicle display device according to claim 11, wherein the on-vehicle display device is incorporated in a front-passenger-seat-side portion of the body surface of the instrument panel.

14. The on-vehicle display device according to claim 11, wherein a surface of the surface panel is visually recognized as part of the instrument panel when no image is displayed.

15. An instrument panel comprising the on-vehicle display device according to claim 11.

16. An on-vehicle display device incorporated in a body surface of an instrument panel of a vehicle, comprising:
    a base which displays an image parallel with the body surface; and a surface panel which covers a surface of the base and guides the image displayed by the base to a driver or passenger-seat-side part of a vehicle compartment, wherein the on-vehicle display device is incorporated so as to extend from a driver or passenger-seat-side portion of the instrument panel to a front end of a windshield, wherein the surface panel comprises plural small apertures formed through the surface panel and open to both an outside of the surface panel and an inside of the surface panel, wherein axial lines of the small apertures are inclined at acute angles through a thickness of the surface panel, wherein at least a first one of the plural small apertures is arranged at a first one of the acute angles through the thickness of the surface panel, wherein at least a second one of the plural small apertures is arranged at a second one of the acute angles through the thickness of the surface panel, and wherein the first one of the acute angles is different than a second one of the acute angles.

17. The on-vehicle display device according to claim 16, wherein the base is formed like stairs on the body surface of the instrument panel so as to conform to it.

18. The on-vehicle display device according to claim 16, wherein the on-vehicle display device is incorporated in a driver-seat-side portion of the body surface of the instrument panel.

19. The on-vehicle display device according to claim 16, wherein the on-vehicle display device is incorporated in a front-passenger-seat-side portion of the body surface of the instrument panel.

20. The on-vehicle display device according to claim 16, wherein the on-vehicle display device is incorporated in such a manner that the body surface and a surface of the surface panel are a same surface of the instrument panel.

21. An instrument panel comprising the on-vehicle display device according to claim 16.

22. The surface panel according to claim 1,
wherein the acute angles of the plural small apertures align with acute angles of a mount base of the instrument panel.

* * * * *